(12) United States Patent
Natsuhara et al.

(10) Patent No.: US 7,090,423 B2
(45) Date of Patent: Aug. 15, 2006

(54) CONNECTING STRUCTURES

(75) Inventors: Masuhiro Natsuhara, Itami (JP); Hirohiko Nakata, Itami (JP); Akira Kuibira, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/248,771

(22) Filed: Feb. 17, 2003

(65) Prior Publication Data

US 2003/0221854 A1    Dec. 4, 2003

(30) Foreign Application Priority Data

Feb. 21, 2002    (JP)    ............... 2002-044477

(51) Int. Cl.
    *F16B 4/00*    (2006.01)
(52) U.S. Cl. ............... 403/28; 403/29; 403/30; 403/271
(58) Field of Classification Search ............... 403/28, 403/29, 30, 270, 271, 272
    See application file for complete search history.

(56) References Cited

U.S. PATENT DOCUMENTS

| | | | | |
|---|---|---|---|---|
| 4,732,047 A | * | 3/1988 | Kato et al. ............... 74/60 |
| 5,028,162 A | * | 7/1991 | Tsuno et al. ............... 403/30 |
| 5,076,484 A | * | 12/1991 | Ito et al. ............... 228/124.7 |
| 5,083,384 A | * | 1/1992 | Possati et al. ............... 33/542 |
| 5,104,747 A | * | 4/1992 | Makino et al. ............ 403/30 X |
| 5,161,908 A | * | 11/1992 | Yoshida et al. ............... 403/29 |
| 5,163,770 A | * | 11/1992 | Soma et al. ............... 403/29 |
| 6,059,483 A | * | 5/2000 | Owens et al. ............... 403/267 |
| 6,574,864 B1 | * | 6/2003 | Meissner et al. ............. 29/877 |
| 6,789,776 B1 | * | 9/2004 | Gavin ............... 249/61 |

FOREIGN PATENT DOCUMENTS

| | | |
|---|---|---|
| JP | S53-066910 A | 6/1978 |
| JP | S60-0077178 A | 5/1985 |
| JP | S60-077180 A | 5/1985 |
| JP | H01-176284 A | 7/1989 |
| JP | H02-237054 A | 9/1990 |
| JP | H03-080162 A | 4/1991 |
| JP | 251896 B2 | 5/1996 |

* cited by examiner

*Primary Examiner*—John R. Cottingham
(74) *Attorney, Agent, or Firm*—James W. Judge

(57) ABSTRACT

Joint formations that, in joining together joining members employed in a variety of electrical and electronic components, yield sufficiently high joint strength in the direction perpendicular to the plane in which two joining members join, and meanwhile in the direction parallel to the joint plane. First and second joining members have respective joint phases each formed with a different number of distinct yet continuous conformational faces, defining the joint phases so that neither is the matching complement of the other. A bonding agent interposed between the joint phases joins the joining members together. The difference in thermal expansion coefficient between the two joining members, and between them and the bonding agent, is $5.0 \times 10^{-6}/°$ C. or less. The joining members are a metal such as tungsten or Cu—W, or a ceramic such as AlN or $Si_3N_4$; and glass or a solder material is utilized for the bonding agent.

18 Claims, 3 Drawing Sheets

CONNECTING STRUCTURES

BACKGROUND OF INVENTION

1. Field of the Invention

The present invention relates to joint structures in which two members made of ceramic or metal are joined together; more particularly it relates to joint formations for superior joint strength and durability.

2. Description of the Background Art

The various joining members in a variety of electrical and electronic components have conventionally been joined by diverse joining techniques. An example is in susceptor electrodes employed in semiconductor fabrication devices, in which case electrodes consisting of tungsten or other metal are joined into an aluminum-nitride or other ceramic substrate. Techniques that employ glass, and techniques that employ brazing/soldering materials, as a bonding agent in joining the various members in such electrical and electronic components are known. For example, the joining of metal to metal or ceramic to ceramic, or of metal to ceramic, is accomplished with joining techniques employing glass. Likewise, the joining of metal to metal, or of metal to ceramic, and the joining of ceramic on which a metallized superficial layer is formed to like metallized ceramic, are generally accomplished by the joining technique employing brazing/soldering materials.

With the conventional joining techniques noted above, joining is by means of a bonding material between, as shown in FIG. 1, two joining members 1 and 2 where they face each other in like single planar surfaces. Specifically, they are joined by setting like planar surfaces of the joining member 1 on the one hand, and of the joining member 2 on the other, in opposition and applying a bonding agent 3 between the opposing planar surfaces.

Nevertheless, a drawback with conventional joint structures of this sort has been that though the joint strength as far as the direction perpendicular to the joint plane is concerned has been sufficiently high, the joint strength in the direction parallel to the joint plane has been weak. In particular, such joint structures have been extremely weak against force acting in the direction parallel to the joint plane. Consequently, if force in a direction parallel to the joint plane should act on the joining member on the one hand, the two joining members will be liable to come simply apart at the joint plane.

SUMMARY OF INVENTION

Taking into consideration what such circumstances to date have been, an object of the present invention is to realize joint formations that, in joining together two joining members employed in a variety of electrical and electronic components, yield sufficiently high joint strength in the direction perpendicular to the plane in which the two joining members join, and meanwhile in the direction parallel to the joint plane.

Joint formations that the present invention provides in order to attain the above-stated object are structures in which two joining members are joined to each other, and are characterized in that the two joining members, each with a plurality of continuous faces as joint faces, are joined to each other by interposing a bonding agent between the joint faces.

The foregoing joint formations as set out by the present invention are characterized in that the difference in coefficient of thermal expansion between the two joining members, and between the joining members and the bonding agent, is $5.0 \times 10^{-6}/°$ C. or less.

The foregoing joint formations as set out by the present invention are further characterized in that the bonding agent is glass or a brazing material. In addition, the two joining members may be any of metal-metal, metal-ceramic, or ceramic-ceramic characterizing combinations.

Furthermore, connecting structures as set out by the present invention are characterized in that the metal may be any among nickel, tungsten, molybdenum, copper, copper-tungsten, or copper-molybdenum; and in that the ceramic may be any among aluminum nitride, silicon nitride, silicon carbide, or aluminum oxide.

From the following detailed description in conjunction with the accompanying drawings, the foregoing and other objects, features, aspects and advantages of the present invention will become readily apparent to those skilled in the art.

DETAILED DESCRIPTION

In joint formations set out by the present invention, two joining members are joined by means of a bonding material interposed between a plurality of continuous aspects in each. In other words, the two joining members in the present invention are each furnished with two or more planar surfaces made continuous, and are joined by means of a bonding agent with these two or more continuous planar surfaces as mutual joint faces.

Joint formations according to the present invention will now be specifically explained with reference to the drawings. In the joint formation depicted in FIG. 2, a first joining member 11, in a surface of which a recess is formed, is joined by means of a bonding agent 3 to a second joining member 12, with the lower-end portion thereof being inserted within the recess. In the first joining member 11 as set out by this joint formation, two continuous aspects, the bottom face and the sidewall of the recess, configure joint faces; and meanwhile, as far as the joint faces of the second joining member 12 are concerned, if for example the second joining member 12 is of round cylindrical form, they will be configured by two continuous aspects, the lower-end planar face and the lower-end circumferential surface (the areas contacting the bonding agent 3).

Figure 3:
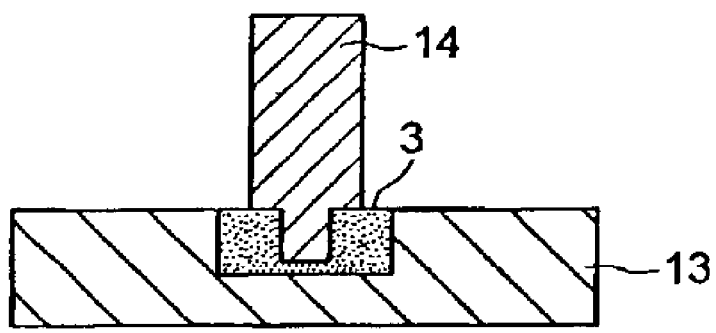
FIG. 3 is a schematic section view representing another specific example of a connecting structure according to the present invention.

In the joint formation depicted in FIG. 3, a recess is formed in a surface of a first joining member 13, while the lower-end surface of a second joining member 14 is provided with a nub; and with the lower-end portion of the second joining member 14 being inserted within the recess in the first joining member 13, they are joined by means of a bonding agent 3. Accordingly, in the first joining member 13 as set out by this joint formation, two continuous aspects, the bottom face and the sidewall of the recess, configure joint faces; and if the second joining member 14 is likewise round-cylindrical in form, its joint faces will be configured by three continuous aspects contacting the bonding agent 3: the lower-end planar face, the side surface of the nub jutting downward from the lower-end planar face, as well as the lower-end bottom face of the nub.

Figure 4:
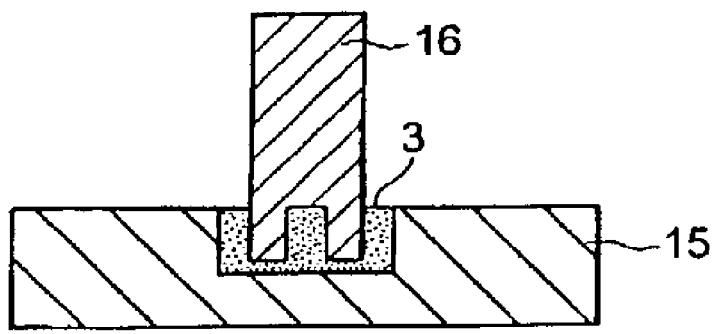
FIG. 4 is a schematic section view representing a different specific example of a connecting structure according to the present invention.

Furthermore, in the joint formation depicted in FIG. 4, a recess is formed in a surface of a first joining member 15, while the lower-end surface of a second joining member 16 is provided with a recess; and with the lower-end portion of the second joining member 16 being inserted within the recess in the first joining member 15, they are joined by means of a bonding agent 3.

In the first joining member 15 as set out by this joint formation, two continuous aspects, the bottom face and the sidewall of the recess, configure joint faces; and meanwhile if the second joining member 16 is likewise round-cylindrical in form, its joint faces will be configured by four continuous aspects contacting the bonding agent 3: the lower-end side surface, the lower-end planar face, as well as the sidewall and the bottom face of the recess bored in the lower-end planar face.

In the foregoing specific examples illustrated in FIGS. 1 through 4, the first (the larger) joining member, in which a recess is provided, is joined to the second (the smaller) joining member, with the lower-end part being inserted within the recess, but joint formations under the present invention are not limited to these; joints by means of multifarious joining members furnished with joining faces consisting of two or more continuous aspects are possible.

Figure 5:
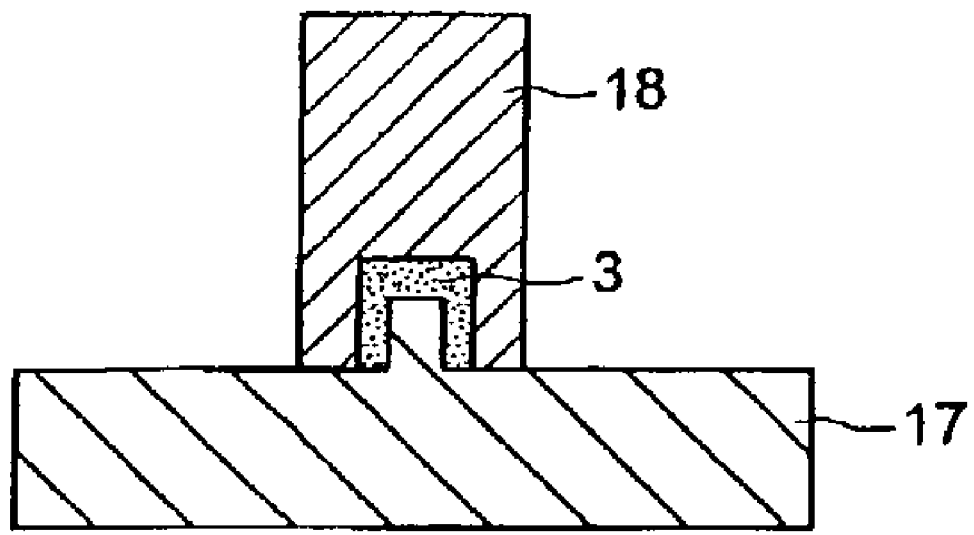
FIG. 5 is a schematic section view representing still different specific example of a connecting structure according to the present invention.

As for example illustrated in FIG. 5, wherein a second joining member 18 is comparatively large, a recess may be formed in the second joining member 18 and, on the planar face of a first joining member 17, a nub; and with the nub on the first joining member 17 being inserted within the recess in the second joining member 18, they may be joined to each other by means of the bonding agent 3.

As defined under the present invention, because joint faces consisting of two or more continuous aspects are joined with a bonding agent, joint formations of this sort enable improving the joint strength between two joining members compared with the situation in which single, like planar surfaces opposing each other are made the joint faces, as has been the case to date—in particular, the joint strength in directions parallel to the joint plane is dramatically improved. This consequently enables preventing the two joining members from coming apart even in situations in which large force acts on the one joining member in a parallel direction with respect to the joint plane.

It is necessary furthermore that the relative difference in thermal expansion coefficient of the two joining members, and of the bonding agent present between them, be $5.0 \times 10^{-6}/^\circ$ C. or less. It is undesirable that the difference in thermal expansion coefficients exceed $5.0 \times 10^{-6}/^\circ$ C., because then stress due to hysteresis of heat that is applied during joining acts on each of the members, making breakage, cracking, and moreover deformations liable to occur.

Glass or a brazing material is preferable as the bonding agent. These bonding agents are desirable because they liquefy during joining to make for close adherence of the joining members. Especially in situations in which pressure is applied to a joint area they are particularly suitable because they make it unlikely that pores will form in the joint area. Glass is preferable as a bonding agent for ceramic-to-ceramic joints, because the thermal expansion coefficient of ceramics in general is small compared to that of metals. In situations in which the joining members are a like metal, the bonding agent preferably is a brazing material in order that the thermal expansion coefficient be lessened. Where the joining of metal with ceramic is concerned, moreover, it is preferable to use as the bonding agent glass, whose difference in thermal expansion coefficient is comparatively small, or else a brazing material.

Metals used for the joining members preferably are nickel, tungsten, molybdenum, copper, copper-tungsten, or copper-molybdenum. Inasmuch as joints are facilitated, and what is more, secure joints can be had, these base materials are preferable not only because when joining they are readily wettable with a brazing material being the bonding agent, but also because they are relatively wettable with glass.

Ceramics used for the joining members preferably are aluminum nitride, silicon nitride, silicon carbide, or aluminum oxide. Inasmuch as these base materials especially are among ceramics relatively high-strength, the materials readily yield secure joints. They are particularly preferable, moreover, inasmuch as with glass being the bonding agent the wettability is favorable, whereby strong joints are produced, due to the fact that aluminum oxide is an oxidized substance, and that the base materials apart from that superficially have a very thin oxidation film.

With aluminum nitride in particular, in fabricating sintered materials a slight amount of an alkaline-earth metal compound or a rare-earth compound is added as a sintering promoter. These are compounds that form by reaction with oxides present on the epi-surface of aluminum nitride. These alkali-earth—aluminum oxides, and rare-earth—aluminum oxides are preferable inasmuch as they are superior in wettability with glass in particular.

Embodiments

The ceramics aluminum nitride, silicon nitride, silicon carbide and aluminum oxide, and the metals and alloys nickel, tungsten, molybdenum, copper, copper-tungsten and copper-molybdenum were prepared as joining members. The thermal expansion coefficients of these joining members are set forth in Table I below.

TABLE I

| Joining member material | Thermal expansion coefficient ($\times 10^{-6}$/K) |
| --- | --- |
| Aluminum nitride | 4.5 |
| Silicon nitride | 3.7 |
| Silicon carbide | 3.5 |
| Aluminum oxide | 6.9 |
| Nickel | 12.8 |
| Tungsten | 4.5 |
| Molybdenum | 5.0 |
| Copper | 14.1 |
| Copper-tungsten | 6.2 |
| Copper-molybdenum | 6.9 |

Here, for the tungsten, molybdenum, copper, copper-tungsten and copper-molybdenum joining members noted above, some were prepared plated with either nickel 2 μm in thickness or gold 1 μm in thickness, as well as furnished with nickel plated 2 μm in thickness and then further plated with gold 1 μm in thickness. Likewise, ceramic joining members metallized with tungsten on top of which the joining members were then plated with nickel 2 μm in thickness were prepared.

The joint faces of the above-noted joining members were worked into whichever of the shapes in FIGS. 1 through 4, and were joined employing as a bonding agent the glass as well as brazing materials set forth in Table II. In making joints as noted above, a load of 10 g/mm² beyond the dead weight of the two joining members was put on the joint portions, which were joined using bonding agent to roughly the same extent as the volume of space remaining between the joint faces of the joining members.

It should be understood that as the materials in the bonding agents set forth in Table II, Glass 1 is 40% ZnO-30% $B_2O_3$-30% $Al_2O_3$, Glass 2 is borosilicate glass, and the active Ag brazing material is 80% Ag-20% Cu. The thermal expansion coefficients of, and the joining temperatures for, the bonding agents are also set forth along with each in Table II below.

TABLE II

| Bonding agent | Thermal expansion coefficient ($\times 10^{-6}$/K) | Joint temperature (° C.) |
|---|---|---|
| Glass 1 | 4.5 | 700 |
| Glass 2 | 6.5 | 650 |
| Active Ag brz. mtrl. | 17.5 | 850 |
| Ag solder | 17.7 | 820 |
| Au solder | 14.4 | 1100 |

In the following Tables III through LIV, the joint-face form, bonding agent utilized, and the bonding atmosphere are set forth for each combination of a joining member 1 with a joining member 2, selected from the joining members set forth in Table I; and meanwhile, evaluations for each of the joint formations in terms of tensile strength and bending strength are respectively indicated. Here, plating and metallization carried out on joining members is indicated within parentheses in the columns for joining member 1 and joining member 2 in each table.

Tensile strength and bending strength were respectively measured by fixing the one of the joining members and, applying a force of 30 kgf, drawing on the other of the joining members perpendicularly for tensile strength, and pressing on it at a right angle with respect to the perpendicular direction for bending strength. As the evaluations therein, instances of coming apart at the joint faces are indicated in the following Tables III through LIV by "x"; instances in which the joining members either broke or were deformed without the joint portion coming apart, by "○"; and instances in which the joining members either broke or were deformed without the joint portion coming apart, but in which cracks appeared in the joint portion, by "Δ."

It should be understood that if the one joining member was Ni or Cu, it could not be joined with AlN, $Si_3N_4$, SiC, $Al_2O_3$, W, Mo, Cu—W, or Cu—Mo no matter which bonding agent from the foregoing Table II was employed. Consequently, as far as combinations in which one of the joining members was Ni or Cu is concerned, only those combinations in which the other joining member was either Ni or Cu and moreover a joint was possible are set forth in Table LIV; combinations apart from those were not tabulated.

Table III.

TABLE III

Figure 1:
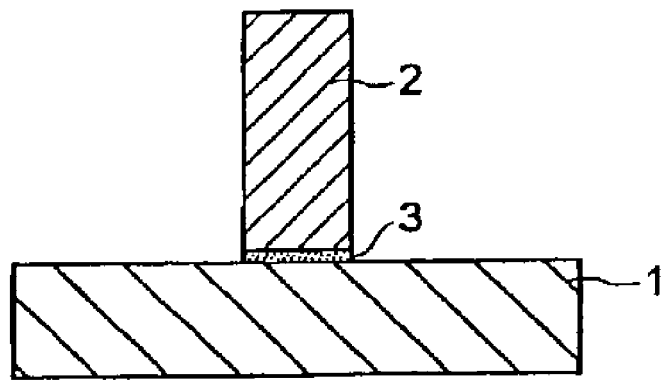
FIG. 1 is an schematic section view representing a conventional connecting structure.
Figure 2:
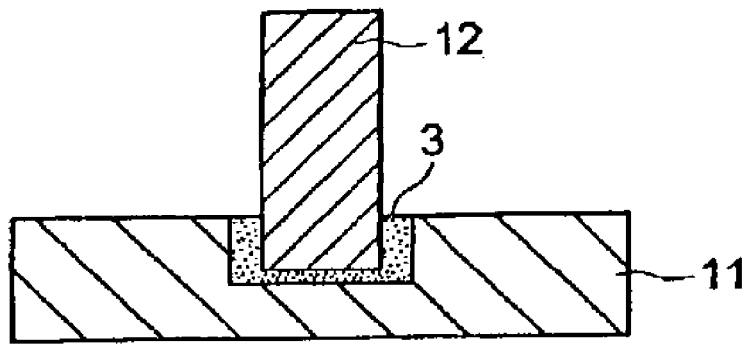
FIG. 2 is a schematic section view representing one specific example of a connecting structure according to the present invention.

| Joining member 1 | Joining member 2 | Form | Bonding agent | Bonding atmosphere | Tensile strength (kgf) | Bending strength (kgf) |
|---|---|---|---|---|---|---|
| AlN | AlN | FIG. 1 | Glass 1 | Nitrogen | ○ | x |
| AlN | AlN | FIG. 1 | Glass 1 | Air | ○ | x |
| AlN | AlN | FIG. 2 | Glass 1 | Nitrogen | ○ | ○ |
| AlN | AlN | FIG. 2 | Glass 1 | Air | ○ | ○ |
| AlN | AlN | FIG. 3 | Glass 1 | Nitrogen | ○ | ○ |
| AlN | AlN | FIG. 3 | Glass 1 | Air | ○ | ○ |
| AlN | AlN | FIG. 4 | Glass 1 | Nitrogen | ○ | ○ |
| AlN | AlN | FIG. 4 | Glass 1 | Air | ○ | ○ |
| AlN | AlN | FIG. 1 | Glass 2 | Nitrogen | ○ | x |
| AlN | AlN | FIG. 1 | Glass 2 | Air | ○ | x |
| AlN | AlN | FIG. 2 | Glass 2 | Nitrogen | ○ | ○ |
| AlN | AlN | FIG. 2 | Glass 2 | Air | ○ | ○ |
| AlN | AlN | FIG. 3 | Glass 2 | Nitrogen | ○ | ○ |
| AlN | AlN | FIG. 3 | Glass 2 | Air | ○ | ○ |
| AlN | AlN | FIG. 4 | Glass 2 | Nitrogen | ○ | ○ |
| AlN | AlN | FIG. 4 | Glass 2 | Air | ○ | ○ |
| AlN | AlN | FIG. 1 | Active Ag brz. mtrl. | Vacuum | ○ | x |
| AlN | AlN | FIG. 2 | Active Ag brz. mtrl. | Vacuum | ○ | Δ |
| AlN | AlN | FIG. 3 | Active Ag brz. mtrl. | Vacuum | ○ | ○ |
| AlN | AlN | FIG. 4 | Active Ag brz. mtrl. | Vacuum | ○ | ○ |
| AlN(W—Ni) | AlN(W—Ni) | FIG. 1 | Ag brz. mtrl. | Hydrogen | ○ | x |
| AlN(W—Ni) | AlN(W—Ni) | FIG. 2 | Ag brz. mtrl. | Hydrogen | ○ | Δ |
| AlN(W—Ni) | AlN(W—Ni) | FIG. 3 | Ag brz. mtrl. | Hydrogen | ○ | ○ |
| AlN(W—Ni) | AlN(W—Ni) | FIG. 4 | Ag brz. mtrl. | Hydrogen | ○ | ○ |
| AlN(W—Ni) | AlN(W—Ni) | FIG. 1 | Au brz. mtrl. | Nitrogen | ○ | x |

TABLE III-continued

| Joining member 1 | Joining member 2 | Form | Bonding agent | Bonding atmosphere | Tensile strength (kgf) | Bending strength (kgf) |
|---|---|---|---|---|---|---|
| AlN(W—Ni) | AlN(W—Ni) | FIG. 2 | Au brz. mtrl. | Nitrogen | ○ | Δ |
| AlN(W—Ni) | AlN(W—Ni) | FIG. 3 | Au brz. mtrl. | Nitrogen | ○ | ○ |
| AlN(W—Ni) | AlN(W—Ni) | FIG. 4 | Au brz. mtrl. | Nitrogen | ○ | ○ |

Table IV.

TABLE IV

| Joining member 1 | Joining member 2 | Form | Bonding agent | Bonding atmosphere | Tensile strength (kgf) | Bending strength (kgf) |
|---|---|---|---|---|---|---|
| AlN | $Si_3N_4$ | FIG. 1 | Glass 1 | Nitrogen | ○ | x |
| AlN | $Si_3N_4$ | FIG. 1 | Glass 1 | Air | ○ | x |
| AlN | $Si_3N_4$ | FIG. 2 | Glass 1 | Nitrogen | ○ | ○ |
| AlN | $Si_3N_4$ | FIG. 2 | Glass 1 | Air | ○ | ○ |
| AlN | $Si_3N_4$ | FIG. 3 | Glass 1 | Nitrogen | ○ | ○ |
| AlN | $Si_3N_4$ | FIG. 3 | Glass 1 | Air | ○ | ○ |
| AlN | $Si_3N_4$ | FIG. 4 | Glass 1 | Nitrogen | ○ | ○ |
| AlN | $Si_3N_4$ | FIG. 4 | Glass 1 | Air | ○ | ○ |
| AlN | $Si_3N_4$ | FIG. 1 | Glass 2 | Nitrogen | ○ | x |
| AlN | $Si_3N_4$ | FIG. 1 | Glass 2 | Air | ○ | x |
| AlN | $Si_3N_4$ | FIG. 2 | Glass 2 | Nitrogen | ○ | ○ |
| AlN | $Si_3N_4$ | FIG. 2 | Glass 2 | Air | ○ | ○ |
| AlN | $Si_3N_4$ | FIG. 3 | Glass 2 | Nitrogen | ○ | ○ |
| AlN | $Si_3N_4$ | FIG. 3 | Glass 2 | Air | ○ | ○ |
| AlN | $Si_3N_4$ | FIG. 4 | Glass 2 | Nitrogen | ○ | ○ |
| AlN | $Si_3N_4$ | FIG. 4 | Glass 2 | Air | ○ | ○ |
| AlN | $Si_3N_4$ | FIG. 1 | Active Ag brz. mtrl. | Vacuum | ○ | x |
| AlN | $Si_3N_4$ | FIG. 2 | Active Ag brz. mtrl. | Vacuum | ○ | Δ |
| AlN | $Si_3N_4$ | FIG. 3 | Active Ag brz. mtrl. | Vacuum | ○ | ○ |
| AlN | $Si_3N_4$ | FIG. 4 | Active Ag brz. mtrl. | Vacuum | ○ | ○ |
| AlN(W—Ni) | $Si_3N_4$(W—Ni) | FIG. 1 | Ag brz. mtrl. | Hydrogen | ○ | x |
| AlN(W—Ni) | $Si_3N_4$(W—Ni) | FIG. 2 | Ag brz. mtrl. | Hydrogen | ○ | Δ |
| AlN(W—Ni) | $Si_3N_4$(W—Ni) | FIG. 3 | Ag brz. mtrl. | Hydrogen | ○ | ○ |
| AlN(W—Ni) | $Si_3N_4$(W—Ni) | FIG. 4 | Ag brz. mtrl. | Hydrogen | ○ | ○ |
| AlN(W—Ni) | $Si_3N_4$(W—Ni) | FIG. 1 | Au brz. mtrl. | Nitrogen | ○ | x |
| AlN(W—Ni) | $Si_3N_4$(W—Ni) | FIG. 2 | Au brz. mtrl. | Nitrogen | ○ | Δ |
| AlN(W—Ni) | $Si_3N_4$(W—Ni) | FIG. 3 | Au brz. mtrl. | Nitrogen | ○ | ○ |
| AlN(W—Ni) | $Si_3N_4$(W—Ni) | FIG. 4 | Au brz. mtrl | Nitrogen | ○ | ○ |

Table V.

TABLE V

| Joining member 1 | Joining member 2 | Form | Bonding agent | Bonding atmosphere | Tensile strength (kgf) | Bending strength (kgf) |
|---|---|---|---|---|---|---|
| AlN | W(Ni—Au) | FIG. 1 | Glass 1 | Nitrogen | ○ | x |
| AlN | W(Ni—Au) | FIG. 2 | Glass 1 | Nitrogen | ○ | ○ |
| AlN | W(Ni—Au) | FIG. 3 | Glass 1 | Nitrogen | ○ | ○ |
| AlN | W(Ni—Au) | FIG. 4 | Glass 1 | Nitrogen | ○ | ○ |
| AlN | W(Ni—Au) | FIG. 1 | Glass 2 | Nitrogen | ○ | x |
| AlN | W(Ni—Au) | FIG. 2 | Glass 2 | Nitrogen | ○ | ○ |
| AlN | W(Ni—Au) | FIG. 3 | Glass 2 | Nitrogen | ○ | ○ |
| AlN | W(Ni—Au) | FIG. 4 | Glass 2 | Nitrogen | ○ | ○ |
| AlN | W | FIG. 1 | Active Ag brz. mtrl. | Vacuum | ○ | x |
| AlN | W | FIG. 2 | Active Ag brz. mtrl. | Vacuum | ○ | Δ |

TABLE V-continued

| Joining member 1 | Joining member 2 | Form | Bonding agent | Bonding atmosphere | Tensile strength (kgf) | Bending strength (kgf) |
|---|---|---|---|---|---|---|
| AlN | W | FIG. 3 | Active Ag brz. mtrl. | Vacuum | ○ | ○ |
| AlN | W | FIG. 4 | Active Ag brz. mtrl. | Vacuum | ○ | ○ |
| AlN(W—Ni) | W | FIG. 1 | Ag brz. mtrl. | Hydrogen | ○ | x |
| AlN(W—Ni) | W | FIG. 2 | Ag brz. mtrl. | Hydrogen | ○ | Δ |
| AlN(W—Ni) | W | FIG. 3 | Ag brz. mtrl. | Hydrogen | ○ | ○ |
| AlN(W—Ni) | W | FIG. 4 | Ag brz. mtrl. | Hydrogen | ○ | ○ |
| AlN(W—Ni) | W | FIG. 1 | Au brz. mtrl. | Nitrogen | ○ | x |
| AlN(W—Ni) | W | FIG. 2 | Au brz. mtrl. | Nitrogen | ○ | Δ |
| AlN(W—Ni) | W | FIG. 3 | Au brz. mtrl. | Nitrogen | ○ | ○ |
| AlN(W—Ni) | W | FIG. 4 | Au brz. mtrl. | Nitrogen | ○ | ○ |

Table VI.

TABLE VI

| Joining member 1 | Joining member 2 | Form | Bonding agent | Bonding atmosphere | Tensile strength (kgf) | Bending strength (kgf) |
|---|---|---|---|---|---|---|
| AlN | Mo(Ni—Au) | FIG. 1 | Glass 1 | Nitrogen | ○ | x |
| AlN | Mo(Ni—Au) | FIG. 2 | Glass 1 | Nitrogen | ○ | ○ |
| AlN | Mo(Ni—Au) | FIG. 3 | Glass 1 | Nitrogen | ○ | ○ |
| AlN | Mo(Ni—Au) | FIG. 4 | Glass 1 | Nitrogen | ○ | ○ |
| AlN | Mo(Ni—Au) | FIG. 1 | Glass 2 | Nitrogen | ○ | x |
| AlN | Mo(Ni—Au) | FIG. 2 | Glass 2 | Nitrogen | ○ | ○ |
| AlN | Mo(Ni—Au) | FIG. 3 | Glass 2 | Nitrogen | ○ | ○ |
| AlN | Mo(Ni—Au) | FIG. 4 | Glass 2 | Nitrogen | ○ | ○ |
| AlN | Mo | FIG. 1 | Active Ag brz. mtrl. | Vacuum | ○ | x |
| AlN | Mo | FIG. 2 | Active Ag brz. mtrl. | Vacuum | ○ | Δ |
| AlN | Mo | FIG. 3 | Active Ag brz. mtrl. | Vacuum | ○ | ○ |
| AlN | Mo | FIG. 4 | Active Ag brz. mtrl. | Vacuum | ○ | ○ |
| AlN(W—Ni) | Mo | FIG. 1 | Ag brz. mtrl. | Hydrogen | ○ | x |
| AlN(W—Ni) | Mo | FIG. 2 | Ag brz. mtrl. | Hydrogen | ○ | Δ |
| AlN(W—Ni) | Mo | FIG. 3 | Ag brz. mtrl. | Hydrogen | ○ | ○ |
| AlN(W—Ni) | Mo | FIG. 4 | Ag brz. mtrl. | Hydrogen | ○ | ○ |
| AlN(W—Ni) | Mo | FIG. 1 | Au brz. mtrl. | Nitrogen | ○ | x |
| AlN(W—Ni) | Mo | FIG. 2 | Au brz. mtrl. | Nitrogen | ○ | Δ |
| AlN(W—Ni) | Mo | FIG. 3 | Au brz. mtrl. | Nitrogen | ○ | ○ |
| AlN(W—Ni) | Mo | FIG. 4 | Au brz. mtrl. | Nitrogen | ○ | ○ |

Table VII.

TABLE VII

| Joining member 1 | Joining member 2 | Form | Bonding agent | Bonding atmosphere | Tensile strength (kgf) | Bending strength (kgf) |
|---|---|---|---|---|---|---|
| AlN | Cu—W(Ni—Au) | FIG. 1 | Glass 1 | Nitrogen | ○ | x |
| AlN | Cu—W(Ni—Au) | FIG. 2 | Glass 1 | Nitrogen | ○ | ○ |
| AlN | Cu—W(Ni—Au) | FIG. 3 | Glass 1 | Nitrogen | ○ | ○ |
| AlN | Cu—W(Ni—Au) | FIG. 4 | Glass 1 | Nitrogen | ○ | ○ |
| AlN | Cu—W(Ni—Au) | FIG. 1 | Glass 2 | Nitrogen | ○ | x |
| AlN | Cu—W(Ni—Au) | FIG. 2 | Glass 2 | Nitrogen | ○ | ○ |
| AlN | Cu—W(Ni—Au) | FIG. 3 | Glass 2 | Nitrogen | ○ | ○ |
| AlN | Cu—W(Ni—Au) | FIG. 4 | Glass 2 | Nitrogen | ○ | ○ |
| AlN(W—Ni) | Cu—W(Ni) | FIG. 1 | Ag brz. mtrl. | Hydrogen | ○ | x |
| AlN(W—Ni) | Cu—W(Ni) | FIG. 2 | Ag brz. mtrl. | Hydrogen | ○ | Δ |
| AlN(W—Ni) | Cu—W(Ni) | FIG. 3 | Ag brz. mtrl. | Hydrogen | ○ | ○ |

TABLE VII-continued

| Joining member 1 | Joining member 2 | Form | Bonding agent | Bonding atmosphere | Tensile strength (kgf) | Bending strength (kgf) |
|---|---|---|---|---|---|---|
| AlN(W—Ni) | Cu—W(Ni) | FIG. 4 | Ag brz. mtrl. | Hydrogen | ○ | ○ |
| AlN | Cu—Mo(Ni—Au) | FIG. 1 | Glass 1 | Nitrogen | ○ | x |
| AlN | Cu—Mo(Ni—Au) | FIG. 2 | Glass 1 | Nitrogen | ○ | ○ |
| AlN | Cu—Mo(Ni—Au) | FIG. 3 | Glass 1 | Nitrogen | ○ | ○ |
| AlN | Cu—Mo(Ni—Au) | FIG. 4 | Glass 1 | Nitrogen | ○ | ○ |
| AlN | Cu—Mo(Ni—Au) | FIG. 1 | Glass 2 | Nitrogen | ○ | x |
| AlN | Cu—Mo(Ni—Au) | FIG. 2 | Glass 2 | Nitrogen | ○ | ○ |
| AlN | Cu—Mo(Ni—Au) | FIG. 3 | Glass 2 | Nitrogen | ○ | ○ |
| AlN | Cu—Mo(Ni—Au) | FIG. 4 | Glass 2 | Nitrogen | ○ | ○ |
| AlN(W—Ni) | Cu—Mo(Ni) | FIG. 1 | Ag brz. mtrl. | Hydrogen | ○ | x |
| AlN(W—Ni) | Cu—Mo(Ni) | FIG. 2 | Ag brz. mtrl. | Hydrogen | ○ | Δ |
| AlN(W—Ni) | Cu—Mo(Ni) | FIG. 3 | Ag brz. mtrl. | Hydrogen | ○ | ○ |
| AlN(W—Ni) | Cu—Mo(Ni) | FIG. 4 | Ag brz. mtrl. | Hydrogen | ○ | ○ |

Table VIII.

TABLE VIII

| Joining member 1 | Joining member 2 | Form | Bonding agent | Bonding atmosphere | Tensile strength (kgf) | Bending strength (kgf) |
|---|---|---|---|---|---|---|
| AlN | SiC | FIG. 1 | Glass 1 | Air | ○ | x |
| AlN | SiC | FIG. 2 | Glass 1 | Air | ○ | ○ |
| AlN | SiC | FIG. 3 | Glass 1 | Air | ○ | ○ |
| AlN | SiC | FIG. 4 | Glass 1 | Air | ○ | ○ |
| AlN | SiC | FIG. 1 | Glass 2 | Air | ○ | x |
| AlN | SiC | FIG. 2 | Glass 2 | Air | ○ | ○ |
| AlN | SiC | FIG. 3 | Glaas 2 | Air | ○ | ○ |
| AlN | SiC | FIG. 4 | Glass 2 | Air | ○ | ○ |
| AlN | SiC | FIG. 1 | Active Ag brz. mtrl. | Vacuum | ○ | x |
| AlN | SiC | FIG. 2 | Active Ag brz. mtrl. | Vacuum | ○ | Δ |
| AlN | SiC | FIG. 3 | Active Ag brz. mtrl. | Vacuum | ○ | ○ |
| AlN | SiC | FIG. 4 | Active Ag brz. mtrl. | Vacuum | ○ | ○ |
| AlN(W—Ni) | SiC(W—Ni) | FIG. 1 | Ag brz. mtrl. | Hydrogen | ○ | x |
| AlN(W—Ni) | SiC(W—Ni) | FIG. 2 | Ag brz. mtrl. | Hydrogen | ○ | Δ |
| AlN(W—Ni) | SiC(W—Ni) | FIG. 3 | Ag brz. mtrl. | Hydrogen | ○ | ○ |
| AlN(W—Ni) | SiC(W—Ni) | FIG. 4 | Ag brz. mtrl. | Hydrogen | ○ | ○ |
| AlN(W—Ni) | SiC(W—Ni) | FIG. 1 | Au brz. mtrl. | Nitrogen | ○ | x |
| AlN(W—Ni) | SiC(W—Ni) | FIG. 2 | Au brz. mtrl. | Nitrogen | ○ | Δ |
| AlN(W—Ni) | SiC(W—Ni) | FIG. 3 | Au brz. mtrl. | Nitrogen | ○ | ○ |
| AlN(W—Ni) | SiC(W—Ni) | FIG. 4 | Au brz. mtrl. | Nitrogen | ○ | ○ |

Table IX.

TABLE IX

| Joining member 1 | Joining member 2 | Form | Bonding agent | Bonding atmosphere | Tensile strength (kgf) | Bending strength (kgf) |
|---|---|---|---|---|---|---|
| AlN | $Al_2O_3$ | FIG. 1 | Glass 1 | Air | ○ | x |
| AlN | $Al_2O_3$ | FIG. 2 | Glass 1 | Air | ○ | ○ |
| AlN | $Al_2O_3$ | FIG. 3 | Glass 1 | Air | ○ | ○ |
| AlN | $Al_2O_3$ | FIG. 4 | Glass 1 | Air | ○ | ○ |
| AlN | $Al_2O_3$ | FIG. 1 | Glass 2 | Air | ○ | x |
| AlN | $Al_2O_3$ | FIG. 2 | Glass 2 | Air | ○ | ○ |
| AlN | $Al_2O_3$ | FIG. 3 | Glass 2 | Air | ○ | ○ |
| AlN | $Al_2O_3$ | FIG. 4 | Glass 2 | Air | ○ | ○ |

TABLE IX-continued

| Joining member 1 | Joining member 2 | Form | Bonding agent | Bonding atmosphere | Tensile strength (kgf) | Bending strength (kgf) |
|---|---|---|---|---|---|---|
| AlN | Al$_2$O$_3$ | FIG. 1 | Active Ag brz. mtrl. | Vacuum | ○ | x |
| AlN | Al$_2$O$_3$ | FIG. 2 | Active Ag brz. mtrl. | Vacuum | ○ | Δ |
| AlN | Al$_2$O$_3$ | FIG. 3 | Active Ag brz. mtrl. | Vacuum | ○ | ○ |
| AlN | Al$_2$O$_3$ | FIG. 4 | Active Ag brz. mtrl. | Vacuum | ○ | ○ |
| AlN(W—Ni) | Al$_2$O$_3$(W—Ni) | FIG. 1 | Ag brz. mtrl. | Hydrogen | x | x |
| AlN(W—Ni) | Al$_2$O$_3$(W—Ni) | FIG. 2 | Ag brz. mtrl. | Hydrogen | x | x |
| AlN(W—Ni) | Al$_2$O$_3$(W—Ni) | FIG. 3 | Ag brz. mtrl. | Hydrogen | x | x |
| AlN(W—Ni) | Al$_2$O$_3$(W—Ni) | FIG. 4 | Ag brz. mtrl. | Hydrogen | x | x |
| AlN(W—Ni) | Al$_2$O$_3$(W—Ni) | FIG. 1 | Au brz. mtrl. | Nitrogen | x | x |
| AlN(W—Ni) | Al$_2$O$_3$(W—Ni) | FIG. 2 | Au brz. mtrl. | Nitrogen | x | x |
| AlN(W—Ni) | Al$_2$O$_3$(W—Ni) | FIG. 3 | Au brz. mtrl. | Nitrogen | x | x |
| AlN(W—Ni) | Al$_2$O$_3$(W—Ni) | FIG. 4 | Au brz. mtrl. | Nitrogen | x | x |

Table X.

TABLE X

| Joining member 1 | Joining member 2 | Form | Bonding agent | Bonding atmosphere | Tensile strength (kgf) | Bending strength (kgf) |
|---|---|---|---|---|---|---|
| Si$_3$N$_4$ | AlN | FIG. 1 | Glass 1 | Air | ○ | x |
| Si$_3$N$_4$ | AlN | FIG. 2 | Glass 1 | Air | ○ | ○ |
| Si$_3$N$_4$ | AlN | FIG. 3 | Glass 1 | Air | ○ | ○ |
| Si$_3$N$_4$ | AlN | FIG. 4 | Glass 1 | Air | ○ | ○ |
| Si$_3$N$_4$ | AlN | FIG. 1 | Glass 2 | Air | ○ | x |
| Si$_3$N$_4$ | AlN | FIG. 2 | Glass 2 | Air | ○ | ○ |
| Si$_3$N$_4$ | AlN | FIG. 3 | Glass 2 | Air | ○ | ○ |
| Si$_3$N$_4$ | AlN | FIG. 4 | Glass 2 | Air | ○ | ○ |
| Si$_3$N$_4$ | AlN | FIG. 1 | Active Ag brz. mtrl. | Vacuum | ○ | x |
| Si$_3$N$_4$ | AlN | FIG. 2 | Active Ag brz. mtrl. | Vacuum | ○ | Δ |
| Si$_3$N$_4$ | AlN | FIG. 3 | Active Ag brz. mtrl. | Vacuum | ○ | ○ |
| Si$_3$N$_4$ | AlN | FIG. 4 | Active Ag brz. mtrl. | Vacuum | ○ | ○ |
| Si$_3$N$_4$(W—Ni) | AlN(W—Ni) | FIG. 1 | Ag brz. mtrl. | Hydrogen | ○ | x |
| Si$_3$N$_4$(W—Ni) | AlN(W—Ni) | FIG. 2 | Ag brz. mtrl. | Hydrogen | ○ | Δ |
| Si$_3$N$_4$(W—Ni) | AlN(W—Ni) | FIG. 3 | Ag brz. mtrl. | Hydrogen | ○ | ○ |
| Si$_3$N$_4$(W—Ni) | AlN(W—Ni) | FIG. 4 | Ag brz. mtrl. | Hydrogen | ○ | ○ |
| Si$_3$N$_4$(W—Ni) | AlN(W—Ni) | FIG. 1 | Au brz. mtrl. | Nitrogen | ○ | x |
| Si$_3$N$_4$(W—Ni) | AlN(W—Ni) | FIG. 2 | Au brz. mtrl. | Nitrogen | ○ | Δ |
| Si$_3$N$_4$(W—Ni) | AlN(W—Ni) | FIG. 3 | Au brz. mtrl. | Nitrogen | ○ | ○ |
| Si$_3$N$_4$(W—Ni) | AlN(W—Ni) | FIG. 4 | Au brz. mtrl. | Nitrogen | ○ | ○ |

Table XI.

TABLE XI

| Joining member 1 | Joining member 2 | Form | Bonding agent | Bonding atmosphere | Tensile strength (kgf) | Bending strength (kgf) |
|---|---|---|---|---|---|---|
| $Si_3N_4$ | $Si_3N_4$ | FIG. 1 | Glass 1 | Air | ○ | x |
| $Si_3N_4$ | $Si_3N_4$ | FIG. 2 | Glass 1 | Air | ○ | ○ |
| $Si_3N_4$ | $Si_3N_4$ | FIG. 3 | Glass 1 | Air | ○ | ○ |
| $Si_3N_4$ | $Si_3N_4$ | FIG. 4 | Glass 1 | Air | ○ | ○ |
| $Si_3N_4$ | $Si_3N_4$ | FIG. 1 | Glass 2 | Air | ○ | x |
| $Si_3N_4$ | $Si_3N_4$ | FIG. 2 | Glass 2 | Air | ○ | ○ |
| $Si_3N_4$ | $Si_3N_4$ | FIG. 3 | Glass 2 | Air | ○ | ○ |
| $Si_3N_4$ | $Si_3N_4$ | FIG. 4 | Glass 2 | Air | ○ | ○ |
| $Si_3N_4$ | $Si_3N_4$ | FIG. 1 | Active Ag brz. mtrl. | Vacuum | ○ | x |
| $Si_3N_4$ | $Si_3N_4$ | FIG. 2 | Active Ag brz. mtrl. | Vacuum | ○ | Δ |
| $Si_3N_4$ | $Si_3N_4$ | FIG. 3 | Active Ag brz. mtrl. | Vacuum | ○ | ○ |
| $Si_3N_4$ | $Si_3N_4$ | FIG. 4 | Active Ag brz. mtrl. | Vacuum | ○ | ○ |
| $Si_3N_4$(W—Ni) | $Si_3N_4$(W—Ni) | FIG. 1 | Ag brz. mtrl. | Hydrogen | ○ | x |
| $Si_3N_4$(W—Ni) | $Si_3N_4$(W—Ni) | FIG. 2 | Ag brz. mtrl. | Hydrogen | ○ | Δ |
| $Si_3N_4$(W—Ni) | $Si_3N_4$(W—Ni) | FIG. 3 | Ag brz. mtrl. | Hydrogen | ○ | ○ |
| $Si_3N_4$(W—Ni) | $Si_3N_4$(W—Ni) | FIG. 4 | Ag brz. mtrl. | Hydrogen | ○ | ○ |
| $Si_3N_4$(W—Ni) | $Si_3N_4$(W—Ni) | FIG. 1 | Au brz. mtrl. | Nitrogen | ○ | x |
| $Si_3N_4$(W—Ni) | $Si_3N_4$(W—Ni) | FIG. 2 | Au brz. mtrl. | Nitrogen | ○ | Δ |
| $Si_3N_4$(W—Ni) | $Si_3N_4$(W—Ni) | FIG. 3 | Au brz. mtrl. | Nitrogen | ○ | ○ |
| $Si_3N_4$(W—Ni) | $Si_3N_4$(W—Ni) | FIG. 4 | Au brz. mtrl. | Nitrogen | ○ | ○ |

Table XII.

TABLE XII

| Joining member 1 | Joining member 2 | Form | Bonding agent | Bonding atmosphere | Tensile strength (kgf) | Bending strength (kgf) |
|---|---|---|---|---|---|---|
| $Si_3N_4$ | W(Ni—Au) | FIG. 1 | Glass 1 | Nitrogen | ○ | x |
| $Si_3N_4$ | W(Ni—Au) | FIG. 2 | Glass 1 | Nitrogen | ○ | ○ |
| $Si_3N_4$ | W(Ni—Au) | FIG. 3 | Glass 1 | Nitrogen | ○ | ○ |
| $Si_3N_4$ | W(Ni—Au) | FIG. 4 | Glass 1 | Nitrogen | ○ | ○ |
| $Si_3N_4$ | W(Ni—Au) | FIG. 1 | Glass 2 | Nitrogen | ○ | x |
| $Si_3N_4$ | W(Ni—Au) | FIG. 2 | Glass 2 | Nitrogen | ○ | ○ |
| $Si_3N_4$ | W(Ni—Au) | FIG. 3 | Glass 2 | Nitrogen | ○ | ○ |
| $Si_3N_4$ | W(Ni—Au) | FIG. 4 | Glass 2 | Nitrogen | ○ | ○ |
| $Si_3N_4$ | W | FIG. 1 | Active Ag brz. mtrl. | Vacuum | ○ | x |
| $Si_3N_4$ | W | FIG. 2 | Active Ag brz. mtrl. | Vacuum | ○ | Δ |
| $Si_3N_4$ | W | FIG. 3 | Active Ag brz. mtrl. | Vacuum | ○ | ○ |
| $Si_3N_4$ | W | FIG. 4 | Active Ag brz. mtrl. | Vacuum | ○ | ○ |
| $Si_3N_4$(W—Ni) | W | FIG. 1 | Ag brz. mtrl. | Hydrogen | ○ | x |
| $Si_3N_4$(W—Ni) | W | FIG. 2 | Ag brz. mtrl. | Hydrogen | ○ | Δ |
| $Si_3N_4$(W—Ni) | W | FIG. 3 | Ag brz. mtrl. | Hydrogen | ○ | ○ |
| $Si_3N_4$(W—Ni) | W | FIG. 4 | Ag brz. mtrl. | Hydrogen | ○ | ○ |
| $Si_3N_4$(W—Ni) | W | FIG. 1 | Au brz. mtrl. | Nitrogen | ○ | x |
| $Si_3N_4$(W—Ni) | W | FIG. 2 | Au brz. mtrl. | Nitrogen | ○ | Δ |

TABLE XII-continued

| Joining member 1 | Joining member 2 | Form | Bonding agent | Bonding atmosphere | Tensile strength (kgf) | Bending strength (kgf) |
|---|---|---|---|---|---|---|
| Si$_3$N$_4$(W—Ni) | W | FIG. 3 | Au brz. mtrl. | Nitrogen | ○ | ○ |
| Si$_3$N$_4$(W—Ni) | W | FIG. 4 | Au brz. mtrl. | Nitrogen | ○ | ○ |

Table XIII.

TABLE XIII

| Joining member 1 | Joining member 2 | Form | Bonding agent | Bonding atmosphere | Tensile strength (kgf) | Bending strength (kgf) |
|---|---|---|---|---|---|---|
| Si$_3$N$_4$ | Mo(Ni—Au) | FIG. 1 | Glass 1 | Nitrogen | ○ | x |
| Si$_3$N$_4$ | Mo(Ni—Au) | FIG. 2 | Glass 1 | Nitrogen | ○ | ○ |
| Si$_3$N$_4$ | Mo(Ni—Au) | FIG. 3 | Glass 1 | Nitrogen | ○ | ○ |
| Si$_3$N$_4$ | Mo(Ni—Au) | FIG. 4 | Glass 1 | Nitrogen | ○ | ○ |
| Si$_3$N$_4$ | Mo(Ni—Au) | FIG. 1 | Glass 2 | Nitrogen | ○ | x |
| Si$_3$N$_4$ | Mo(Ni—Au) | FIG. 2 | Glass 2 | Nitrogen | ○ | ○ |
| Si$_3$N$_4$ | Mo(Ni—Au) | FIG. 3 | Glass 2 | Nitrogen | ○ | ○ |
| Si$_3$N$_4$ | Mo(Ni—Au) | FIG. 4 | Glass 2 | Nitrogen | ○ | ○ |
| Si$_3$N$_4$ | Mo | FIG. 1 | Active Ag brz. mtrl. | Vacuum | ○ | x |
| Si$_3$N$_4$ | Mo | FIG. 2 | Active Ag brz. mtrl. | Vacuum | ○ | Δ |
| Si$_3$N$_4$ | Mo | FIG. 3 | Active Ag brz. mtrl. | Vacuum | ○ | ○ |
| Si$_3$N$_4$ | Mo | FIG. 4 | Active Ag brz. mtrl. | Vacuum | ○ | ○ |
| Si$_3$N$_4$(W—Ni) | Mo | FIG. 1 | Ag brz. mtrl. | Hydrogen | ○ | x |
| Si$_3$N$_4$(W—Ni) | Mo | FIG. 2 | Ag brz. mtrl. | Hydrogen | ○ | Δ |
| Si$_3$N$_4$(W—Ni) | Mo | FIG. 3 | Ag brz. mtrl. | Hydrogen | ○ | ○ |
| Si$_3$N$_4$(W—Ni) | Mo | FIG. 4 | Ag brz. mtrl. | Hydrogen | ○ | ○ |
| Si$_3$N$_4$(W—Ni) | Mo | FIG. 1 | Au brz. mtrl. | Nitrogen | ○ | x |
| Si$_3$N$_4$(W—Ni) | Mo | FIG. 2 | Au brz. mtrl. | Nitrogen | ○ | Δ |
| Si$_3$N$_4$(W—Ni) | Mo | FIG. 3 | Au brz. mtrl. | Nitrogen | ○ | ○ |
| Si$_3$N$_4$(W—Ni) | Mo | FIG. 4 | Au brz. mtrl. | Nitrogen | ○ | ○ |

Table XIV.

TABLE XIV

| Joining member 1 | Joining member 2 | Form | Bonding agent | Bonding atmosphere | Tensile strength (kgf) | Bending strength (kgf) |
|---|---|---|---|---|---|---|
| Si$_3$N$_4$ | Cu—W(Ni—Au) | FIG. 1 | Glass 1 | Nitrogen | ○ | x |
| Si$_3$N$_4$ | Cu—W(Ni—Au) | FIG. 2 | Glass 1 | Nitrogen | ○ | ○ |
| Si$_3$N$_4$ | Cu—W(Ni—Au) | FIG. 3 | Glass 1 | Nitrogen | ○ | ○ |
| Si$_3$N$_4$ | Cu—W(Ni—Au) | FIG. 4 | Glass 1 | Nitrogen | ○ | ○ |
| Si$_3$N$_4$ | Cu—W(Ni—Au) | FIG. 1 | Glass 2 | Nitrogen | ○ | x |
| Si$_3$N$_4$ | Cu—W(Ni—Au) | FIG. 2 | Glass 2 | Nitrogen | ○ | ○ |
| Si$_3$N$_4$ | Cu—W(Ni—Au) | FIG. 3 | Glass 2 | Nitrogen | ○ | ○ |
| Si$_3$N$_4$ | Cu—W(Ni—Au) | FIG. 4 | Glass 2 | Nitrogen | ○ | ○ |
| Si$_3$N$_4$(W—Ni) | Cu—W | FIG. 1 | Ag brz. mtrl. | Hydrogen | ○ | x |
| Si$_3$N$_4$(W—Ni) | Cu—W | FIG. 2 | Ag brz. mtrl. | Hydrogen | ○ | Δ |
| Si$_3$N$_4$(W—Ni) | Cu—W | FIG. 3 | Ag brz. mtrl. | Hydrogen | ○ | ○ |

TABLE XIV-continued

| Joining member 1 | Joining member 2 | Form | Bonding agent | Bonding atmosphere | Tensile strength (kgf) | Bending strength (kgf) |
|---|---|---|---|---|---|---|
| Si$_3$N$_4$(W—Ni) | Cu—W | FIG. 4 | Ag brz. mtrl. | Hydrogen | ○ | ○ |
| Si$_3$N$_4$ | Cu—Mo (Ni—Au) | FIG. 1 | Glass 1 | Nitrogen | ○ | x |
| Si$_3$N$_4$ | Cu—Mo (Ni—Au) | FIG. 2 | Glass 1 | Nitrogen | ○ | ○ |
| Si$_3$N$_4$ | Cu—Mo (Ni—Au) | FIG. 3 | Glass 1 | Nitrogen | ○ | ○ |
| Si$_3$N$_4$ | Cu—Mo (Ni—Au) | FIG. 4 | Glass 1 | Nitrogen | ○ | ○ |
| Si$_3$N$_4$ | Cu—Mo (Ni—Au) | FIG. 1 | Glass 2 | Nitrogen | ○ | x |
| Si$_3$N$_4$ | Cu—Mo (Ni—Au) | FIG. 2 | Glass 2 | Nitrogen | ○ | ○ |
| Si$_3$N$_4$ | Cu—Mo (Ni—Au) | FIG. 3 | Glass 2 | Nitrogen | ○ | ○ |
| Si$_3$N$_4$ | Cu—Mo (Ni—Au) | FIG. 4 | Glass 2 | Nitrogen | ○ | ○ |
| Si$_3$N$_4$(W—Ni) | Cu—Mo(Ni) | FIG. 1 | Ag brz. mtrl. | Hydrogen | ○ | x |
| Si$_3$N$_4$(W—Ni) | Cu—Mo(Ni) | FIG. 2 | Ag brz. mtrl. | Hydrogen | ○ | Δ |
| Si$_3$N$_4$(W—Ni) | Cu—Mo(Ni) | FIG. 3 | Ag brz. mtrl. | Hydrogen | ○ | ○ |
| Si$_3$N$_4$(W—Ni) | Cu—Mo(Ni) | FIG. 4 | Ag brz. mtrl. | Hydrogen | ○ | ○ |

Table XV.

TABLE XV

| Joining member 1 | Joining member 2 | Form | Bonding agent | Bonding atmosphere | Tensile strength (kgf) | Bending strength (kgf) |
|---|---|---|---|---|---|---|
| Si$_3$N$_4$ | SiC | FIG. 1 | Glass 1 | Air | ○ | x |
| Si$_3$N$_4$ | SiC | FIG. 2 | Glass 1 | Air | ○ | ○ |
| Si$_3$N$_4$ | SiC | FIG. 3 | Glass 1 | Air | ○ | ○ |
| Si$_3$N$_4$ | SiC | FIG. 4 | Glass 1 | Air | ○ | ○ |
| Si$_3$N$_4$ | SiC | FIG. 1 | Glass 2 | Air | ○ | x |
| Si$_3$N$_4$ | SiC | FIG. 2 | Glass 2 | Air | ○ | ○ |
| Si$_3$N$_4$ | SiC | FIG. 3 | Glass 2 | Air | ○ | ○ |
| Si$_3$N$_4$ | SiC | FIG. 4 | Glass 2 | Air | ○ | ○ |
| Si$_3$N$_4$ | SiC | FIG. 1 | Active Ag brz. mtrl. | Vacuum | ○ | x |
| Si$_3$N$_4$ | SiC | FIG. 2 | Active Ag brz. mtrl. | Vacuum | ○ | Δ |
| Si$_3$N$_4$ | SiC | FIG. 3 | Active Ag brz. mtrl. | Vacuum | ○ | ○ |
| Si$_3$N$_4$ | SiC | FIG. 4 | Active Ag brz. mtrl. | Vacuum | ○ | ○ |
| Si$_3$N$_4$(W—Ni) | SiC(W—Ni) | FIG. 1 | Ag brz. mtrl. | Hydrogen | ○ | x |
| Si$_3$N$_4$(W—Ni) | SiC(W—Ni) | FIG. 2 | Ag brz. mtrl. | Hydrogen | ○ | Δ |
| Si$_3$N$_4$(W—Ni) | SiC(W—Ni) | FIG. 3 | Ag brz. mtrl. | Hydrogen | ○ | ○ |
| Si$_3$N$_4$(W—Ni) | SiC(W—Ni) | FIG. 4 | Ag brz. mtrl. | Hydrogen | ○ | ○ |
| Si$_3$N$_4$(W—Ni) | SiC(W—Ni) | FIG. 1 | Au brz. mtrl. | Nitrogen | ○ | x |
| Si$_3$N$_4$(W—Ni) | SiC(W—Ni) | FIG. 2 | Au brz. mtrl. | Nitrogen | ○ | Δ |
| Si$_3$N$_4$(W—Ni) | SiC(W—Ni) | FIG. 3 | Au brz. mtrl. | Nitrogen | ○ | ○ |
| Si$_3$N$_4$(W—Ni) | SiC(W—Ni) | FIG. 4 | Au brz. mtrl. | Nitrogen | ○ | ○ |

Table XVI.

TABLE XVI

| Joining member 1 | Joining member 2 | Form | Bonding agent | Bonding atmosphere | Tensile strength (kgf) | Bending strength (kgf) |
|---|---|---|---|---|---|---|
| $Si_3N_4$ | $Al_2O_3$ | FIG. 1 | Glass 1 | Air | ○ | x |
| $Si_3N_4$ | $Al_2O_3$ | FIG. 2 | Glass 1 | Air | ○ | ○ |
| $Si_3N_4$ | $Al_2O_3$ | FIG. 3 | Glass 1 | Air | ○ | ○ |
| $Si_3N_4$ | $Al_2O_3$ | FIG. 4 | Glass 1 | Air | ○ | ○ |
| $Si_3N_4$ | $Al_2O_3$ | FIG. 1 | Glass 2 | Air | ○ | x |
| $Si_3N_4$ | $Al_2O_3$ | FIG. 2 | Glass 2 | Air | ○ | ○ |
| $Si_3N_4$ | $Al_2O_3$ | FIG. 3 | Glass 2 | Air | ○ | ○ |
| $Si_3N_4$ | $Al_2O_3$ | FIG. 4 | Glass 2 | Air | ○ | ○ |
| $Si_3N_4$ | $Al_2O_3$ | FIG. 1 | Active Ag brz. mtrl. | Vacuum | ○ | x |
| $Si_3N_4$ | $Al_2O_3$ | FIG. 2 | Active Ag brz. mtrl. | Vacuum | ○ | Δ |
| $Si_3N_4$ | $Al_2O_3$ | FIG. 3 | Active Ag brz. mtrl. | Vacuum | ○ | ○ |
| $Si_3N_4$ | $Al_2O_3$ | FIG. 4 | Active Ag brz. mtrl. | Vacuum | ○ | ○ |
| $Si_3N_4$(W—Ni) | $Al_2O_3$(W—Ni) | FIG. 1 | Ag brz. mtrl. | Hydrogen | x | x |
| $Si_3N_4$(W—Ni) | $Al_2O_3$(W—Ni) | FIG. 2 | Ag brz. mtrl. | Hydrogen | x | x |
| $Si_3N_4$(W—Ni) | $Al_2O_3$(W—Ni) | FIG. 3 | Ag brz. mtrl. | Hydrogen | x | x |
| $Si_3N_4$(W—Ni) | $Al_2O_3$(W—Ni) | FIG. 4 | Ag brz. mtrl. | Hydrogen | x | x |
| $Si_3N_4$(W—Ni) | $Al_2O_3$(W—Ni) | FIG. 1 | Au brz. mtrl. | Nitrogen | x | x |
| $Si_3N_4$(W—Ni) | $Al_2O_3$(W—Ni) | FIG. 2 | Au brz. mtrl. | Nitrogen | x | x |
| $Si_3N_4$(W—Ni) | $Al_2O_3$(W—Ni) | FIG. 3 | Au brz. mtrl. | Nitrogen | x | x |
| $Si_3N_4$(W—Ni) | $Al_2O_3$(W—Ni) | FIG. 4 | Au brz. mtrl. | Nitrogen | x | x |

Table XVII.

TABLE XVII

| Joining member 1 | Joining member 2 | Form | Bonding agent | Bonding atmosphere | Tensile strength (kgf) | Bending strength (kgf) |
|---|---|---|---|---|---|---|
| SiC | AlN | FIG. 1 | Glass 1 | Air | ○ | x |
| SiC | AlN | FIG. 2 | Glass 1 | Air | ○ | ○ |
| SiC | AlN | FIG. 3 | Glass 1 | Air | ○ | ○ |
| SiC | AlN | FIG. 4 | Glass 1 | Air | ○ | ○ |
| SiC | AlN | FIG. 1 | Glass 2 | Air | ○ | x |
| SiC | AlN | FIG. 2 | Glass 2 | Air | ○ | ○ |
| SiC | AlN | FIG. 3 | Glass 2 | Air | ○ | ○ |
| SiC | AlN | FIG. 4 | Glass 2 | Air | ○ | ○ |
| SiC | AlN | FIG. 1 | Active Ag brz. mtrl. | Vacuum | ○ | x |
| SiC | AlN | FIG. 2 | Active Ag brz. mtrl. | Vacuum | ○ | Δ |
| SiC | AlN | FIG. 3 | Active Ag brz. mtrl. | Vacuum | ○ | ○ |
| SiC | AlN | FIG. 4 | Active Ag brz. mtrl. | Vacuum | ○ | ○ |
| SiC(W—Ni) | AlN(W—Ni) | FIG. 1 | Ag brz. mtrl. | Hydrogen | ○ | x |
| SiC(W—Ni) | AlN(W—Ni) | FIG. 2 | Ag brz. mtrl. | Hydrogen | ○ | Δ |
| SiC(W—Ni) | AlN(W—Ni) | FIG. 3 | Ag brz. mtrl. | Hydrogen | ○ | ○ |
| SiC(W—Ni) | AlN(W—Ni) | FIG. 4 | Ag brz. mtrl. | Hydrogen | ○ | ○ |
| SiC(W—Ni) | AlN(W—Ni) | FIG. 1 | Au brz. mtrl. | Nitrogen | ○ | x |
| SiC(W—Ni) | AlN(W—Ni) | FIG. 2 | Au brz. mtrl. | Nitrogen | ○ | Δ |
| SiC(W—Ni) | AlN(W—Ni) | FIG. 3 | Au brz. mtrl. | Nitrogen | ○ | ○ |
| SiC(W—Ni) | AlN(W—Ni) | FIG. 4 | Au brz. mtrl. | Nitrogen | ○ | ○ |

Table XVIII.

TABLE XVIII

| Joining member 1 | Joining member 2 | Form | Bonding agent | Bonding atmosphere | Tensile strength (kgf) | Bending strength (kgf) |
|---|---|---|---|---|---|---|
| SiC | $Si_3N_4$ | FIG. 1 | Glass 1 | Air | ◯ | × |
| SiC | $Si_3N_4$ | FIG. 2 | Glass 1 | Air | ◯ | ◯ |
| SiC | $Si_3N_4$ | FIG. 3 | Glass 1 | Air | ◯ | ◯ |
| SiC | $Si_3N_4$ | FIG. 4 | Glass 1 | Air | ◯ | ◯ |
| SiC | $Si_3N_4$ | FIG. 1 | Glass 2 | Air | ◯ | × |
| SiC | $Si_3N_4$ | FIG. 2 | Glass 2 | Air | ◯ | ◯ |
| SiC | $Si_3N_4$ | FIG. 3 | Glass 2 | Air | ◯ | ◯ |
| SiC | $Si_3N_4$ | FIG. 4 | Glass 2 | Air | ◯ | ◯ |
| SiC | $Si_3N_4$ | FIG. 1 | Active Ag brz. mtrl. | Vacuum | ◯ | × |
| SiC | $Si_3N_4$ | FIG. 2 | Active Ag brz. mtrl. | Vacuum | ◯ | Δ |
| SiC | $Si_3N_4$ | FIG. 3 | Active Ag brz. mtrl. | Vacuum | ◯ | ◯ |
| SiC | $Si_3N_4$ | FIG. 4 | Active Ag brz. mtrl. | Vacuum | ◯ | ◯ |
| SiC(W—Ni) | $Si_3N_4$(W—Ni) | FIG. 1 | Ag brz. mtrl. | Hydrogen | ◯ | × |
| SiC(W—Ni) | $Si_3N_4$(W—Ni) | FIG. 2 | Ag brz. mtrl. | Hydrogen | ◯ | Δ |
| SiC(W—Ni) | $Si_3N_4$(W—Ni) | FIG. 3 | Ag brz. mtrl. | Hydrogen | ◯ | ◯ |
| SiC(W—Ni) | $Si_3N_4$(W—Ni) | FIG. 4 | Ag brz. mtrl. | Hydrogen | ◯ | ◯ |
| SiC(W—Ni) | $Si_3N_4$(W—Ni) | FIG. 1 | Au brz. mtrl. | Nitrogen | ◯ | × |
| SiC(W—Ni) | $Si_3N_4$(W—Ni) | FIG. 2 | Au brz. mtrl. | Nitrogen | ◯ | Δ |
| SiC(W—Ni) | $Si_3N_4$(W—Ni) | FIG. 3 | Au brz. mtrl. | Nitrogen | ◯ | ◯ |
| SiC(W—Ni) | $Si_3N_4$(W—Ni) | FIG. 4 | Au brz. mtrl. | Nitrogen | ◯ | ◯ |

Table XIX.

TABLE XIX

| Joining member 1 | Joining member 2 | Form | Bonding agent | Bonding atmosphere | Tensile strength (kgf) | Bending strength (kgf) |
|---|---|---|---|---|---|---|
| SiC | W(Ni—Au) | FIG. 1 | Glass 1 | Air | ◯ | × |
| SiC | W(Ni—Au) | FIG. 2 | Glass 1 | Air | ◯ | ◯ |
| SiC | W(Ni—Au) | FIG. 3 | Glass 1 | Air | ◯ | ◯ |
| SiC | W(Ni—Au) | FIG. 4 | Glass 1 | Air | ◯ | ◯ |
| SiC | W(Ni—Au) | FIG. 1 | Glass 2 | Air | ◯ | × |
| SiC | W(Ni—Au) | FIG. 2 | Glass 2 | Air | ◯ | ◯ |
| SiC | W(Ni—Au) | FIG. 3 | Glass 2 | Air | ◯ | ◯ |
| SiC | W(Ni—Au) | FIG. 4 | Glass 2 | Air | ◯ | ◯ |
| SiC | W | FIG. 1 | Active Ag brz. mtrl. | Vacuum | ◯ | × |
| SiC | W | FIG. 2 | Active Ag brz. mtrl. | Vacuum | ◯ | Δ |
| SiC | W | FIG. 3 | Active Ag brz. mtrl. | Vacuum | ◯ | ◯ |
| SiC | W | FIG. 4 | Active Ag brz. mtrl. | Vacuum | ◯ | ◯ |
| SiC(W—Ni) | W | FIG. 1 | Ag brz. mtrl. | Hydrogen | ◯ | × |
| SiC(W—Ni) | W | FIG. 2 | Ag brz. mtrl. | Hydrogen | ◯ | Δ |
| SiC(W—Ni) | W | FIG. 3 | Ag brz. mtrl. | Hydrogen | ◯ | ◯ |
| SiC(W—Ni) | W | FIG. 4 | Ag brz. mtrl. | Hydrogen | ◯ | ◯ |
| SiC(W—Ni) | W | FIG. 1 | Au brz. mtrl. | Nitrogen | ◯ | × |
| SiC(W—Ni) | W | FIG. 2 | Au brz. mtrl. | Nitrogen | ◯ | Δ |
| SiC(W—Ni) | W | FIG. 3 | Au brz. mtrl. | Nitrogen | ◯ | ◯ |
| SiC(W—Ni) | W | FIG. 4 | Au brz. mtrl. | Nitrogen | ◯ | ◯ |

Table XX.

TABLE XX

| Joining member 1 | Joining member 2 | Form | Bonding agent | Bonding atmosphere | Tensile strength (kgf) | Bending strength (kgf) |
|---|---|---|---|---|---|---|
| SiC | Mo(Ni—Au) | FIG. 1 | Glass 1 | Nitrogen | ○ | x |
| SiC | Mo(Ni—Au) | FIG. 2 | Glass 1 | Nitrogen | ○ | ○ |
| SiC | Mo(Ni—Au) | FIG. 3 | Glass 1 | Nitrogen | ○ | ○ |
| SiC | Mo(Ni—Au) | FIG. 4 | Glass 1 | Nitrogen | ○ | ○ |
| SiC | Mo(Ni—Au) | FIG. 1 | Glass 2 | Nitrogen | ○ | x |
| SiC | Mo(Ni—Au) | FIG. 2 | Glass 2 | Nitrogen | ○ | ○ |
| SiC | Mo(Ni—Au) | FIG. 3 | Glass 2 | Nitrogen | ○ | ○ |
| SiC | Mo(Ni—Au) | FIG. 4 | Glass 2 | Nitrogen | ○ | ○ |
| SiC | Mo | FIG. 1 | Active Ag brz. mtrl. | Vacuum | ○ | x |
| SiC | Mo | FIG. 2 | Active Ag brz. mtrl. | Vacuum | ○ | Δ |
| SiC | Mo | FIG. 3 | Active Ag brz. mtrl. | Vacuum | ○ | ○ |
| SiC | Mo | FIG. 4 | Active Ag brz. mtrl. | Vacuum | ○ | ○ |
| SiC(W—Ni) | Mo(Ni) | FIG. 1 | Ag brz. mtrl. | Hydrogen | ○ | x |
| SiC(W—Ni) | Mo(Ni) | FIG. 2 | Ag brz. mtrl. | Hydrogen | ○ | Δ |
| SiC(W—Ni) | Mo(Ni) | FIG. 3 | Ag brz. mtrl. | Hydrogen | ○ | ○ |
| SiC(W—Ni) | Mo(Ni) | FIG. 4 | Ag brz. mtrl. | Hydrogen | ○ | ○ |
| SiC(W—Ni) | Mo | FIG. 1 | Au brz. mtrl. | Nitrogen | ○ | x |
| SiC(W—Ni) | Mo | FIG. 2 | Au brz. mtrl. | Nitrogen | ○ | Δ |
| SiC(W—Ni) | Mo | FIG. 3 | Au brz. mtrl. | Nitrogen | ○ | ○ |
| SiC(W—Ni) | Mo | FIG. 4 | Au brz. mtrl. | Nitrogen | ○ | ○ |

Table XXI.

TABLE XXI

| Joining member 1 | Joining member 2 | Form | Bonding agent | Bonding atmosphere | Tensile strength (kgf) | Bending strength (kgf) |
|---|---|---|---|---|---|---|
| SiC | Cu—W(Ni—Au) | FIG. 1 | Glass 1 | Nitrogen | ○ | x |
| SiC | Cu—W(Ni—Au) | FIG. 2 | Glass 1 | Nitrogen | ○ | ○ |
| SiC | Cu—W(Ni—Au) | FIG. 3 | Glass 1 | Nitrogen | ○ | ○ |
| SiC | Cu—W(Ni—Au) | FIG. 4 | Glass 1 | Nitrogen | ○ | ○ |
| SiC | Cu—W(Ni—Au) | FIG. 1 | Glass 2 | Nitrogen | ○ | x |
| SiC | Cu—W(Ni—Au) | FIG. 2 | Glass 2 | Nitrogen | ○ | ○ |
| SiC | Cu—W(Ni—Au) | FIG. 3 | Glass 2 | Nitrogen | ○ | ○ |
| SiC | Cu—W(Ni—Au) | FIG. 4 | Glass 2 | Nitrogen | ○ | ○ |
| SiC(W—Ni) | Cu—W | FIG. 1 | Ag brz. mtrl. | Hydrogen | ○ | x |
| SiC(W—Ni) | Cu—W | FIG. 2 | Ag brz. mtrl. | Hydrogen | ○ | Δ |
| SiC(W—Ni) | Cu—W | FIG. 3 | Ag brz. mtrl. | Hydrogen | ○ | ○ |
| SiC(W—Ni) | Cu—W | FIG. 4 | Ag brz. mtrl. | Hydrogen | ○ | ○ |
| SiC | Cu—Mo(Ni—Au) | FIG. 1 | Glass 1 | Nitrogen | ○ | x |
| SiC | Cu—Mo(Ni—Au) | FIG. 2 | Glass 1 | Nitrogen | ○ | ○ |
| SiC | Cu—Mo(Ni—Au) | FIG. 3 | Glass 1 | Nitrogen | ○ | ○ |
| SiC | Cu—Mo(Ni—Au) | FIG. 4 | Glass 1 | Nitrogen | ○ | ○ |
| SiC | Cu—Mo(Ni—Au) | FIG. 1 | Glass 2 | Nitrogen | ○ | x |
| SiC | Cu—Mo(Ni—Au) | FIG. 2 | Glass 2 | Nitrogen | ○ | ○ |
| SiC | Cu—Mo(Ni—Au) | FIG. 3 | Glass 2 | Nitrogen | ○ | ○ |
| SiC | Cu—Mo(Ni—Au) | FIG. 4 | Glass 2 | Nitrogen | ○ | ○ |
| SiC(W—Ni) | Cu—Mo | FIG. 1 | Ag brz. mtrl. | Hydrogen | ○ | x |
| SiC(W—Ni) | Cu—Mo | FIG. 2 | Ag brz. mtrl. | Hydrogen | ○ | Δ |

TABLE XXI-continued

| Joining member 1 | Joining member 2 | Form | Bonding agent | Bonding atmosphere | Tensile strength (kgf) | Bending strength (kgf) |
|---|---|---|---|---|---|---|
| SiC(W—Ni) | Cu—Mo | FIG. 3 | Ag brz. mtrl. | Hydrogen | ○ | ○ |
| SiC(W—Ni) | Cu—Mo | FIG. 4 | Ag brz. mtrl. | Hydrogen | ○ | ○ |

Table XXII.

TABLE XXII

| Joining member 1 | Joining member 2 | Form | Bonding agent | Bonding atmosphere | Tensile strength (kgf) | Bending strength (kgf) |
|---|---|---|---|---|---|---|
| SiC | SiC | FIG. 1 | Glass 1 | Air | ○ | x |
| SiC | SiC | FIG. 2 | Glass 1 | Air | ○ | ○ |
| SiC | SiC | FIG. 3 | Glass 1 | Air | ○ | ○ |
| SiC | SiC | FIG. 4 | Glass 1 | Air | ○ | ○ |
| SiC | SiC | FIG. 1 | Glass 2 | Air | ○ | x |
| SiC | SiC | FIG. 2 | Glass 2 | Air | ○ | ○ |
| SiC | SiC | FIG. 3 | Glass 2 | Air | ○ | ○ |
| SiC | SiC | FIG. 4 | Glass 2 | Air | ○ | ○ |
| SiC | SiC | FIG. 1 | Active Ag brz. mtrl. | Vacuum | ○ | x |
| SiC | SiC | FIG. 2 | Active Ag brz. mtrl. | Vacuum | ○ | Δ |
| SiC | SiC | FIG. 3 | Active Ag brz. mtrl. | Vacuum | ○ | ○ |
| SiC | SiC | FIG. 4 | Active Ag brz. mtrl. | Vacuum | ○ | ○ |
| SiC(W—Ni) | SiC(W—Ni) | FIG. 1 | Ag brz. mtrl. | Hydrogen | ○ | x |
| SiC(W—Ni) | SiC(W—Ni) | FIG. 2 | Ag brz. mtrl. | Hydrogen | ○ | Δ |
| SiC(W—Ni) | SiC(W—Ni) | FIG. 3 | Ag brz. mtrl. | Hydrogen | ○ | ○ |
| SiC(W—Ni) | SiC(W—Ni) | FIG. 4 | Ag brz. mtrl. | Hydrogen | ○ | ○ |
| SiC(W—Ni) | SiC(W—Ni) | FIG. 1 | Ag brz. mtrl. | Nitrogen | ○ | x |
| SiC(W—Ni) | SiC(W—Ni) | FIG. 2 | Ag brz. mtrl. | Nitrogen | ○ | Δ |
| SiC(W—Ni) | SiC(W—Ni) | FIG. 3 | Ag brz. mtrl. | Nitrogen | ○ | ○ |
| SiC(W—Ni) | SiC(W—Ni) | FIG. 4 | Ag brz. mtrl. | Nitrogen | ○ | ○ |

Table XXIII.

TABLE XXIII

| Joining member 1 | Joining member 2 | Form | Bonding agent | Bonding atmosphere | Tensile strength (kgf) | Bending strength (kgf) |
|---|---|---|---|---|---|---|
| SiC | $Al_2O_3$ | FIG. 1 | Glass 1 | Air | ○ | x |
| SiC | $Al_2O_3$ | FIG. 2 | Glass 1 | Air | ○ | ○ |
| SiC | $Al_2O_3$ | FIG. 3 | Glass 1 | Air | ○ | ○ |
| SiC | $Al_2O_3$ | FIG. 4 | Glass 1 | Air | ○ | ○ |
| SiC | $Al_2O_3$ | FIG. 1 | Glass 2 | Air | ○ | x |
| SiC | $Al_2O_3$ | FIG. 2 | Glass 2 | Air | ○ | ○ |
| SiC | $Al_2O_3$ | FIG. 3 | Glass 2 | Air | ○ | ○ |
| SiC | $Al_2O_3$ | FIG. 4 | Glass 2 | Air | ○ | ○ |
| SiC | $Al_2O_3$ | FIG. 1 | Active Ag brz. mtrl. | Vacuum | ○ | x |
| SiC | $Al_2O_3$ | FIG. 2 | Active Ag brz. mtrl. | Vacuum | ○ | Δ |
| SiC | $Al_2O_3$ | FIG. 3 | Active Ag brz. mtrl. | Vacuum | ○ | ○ |
| SiC | $Al_2O_3$ | FIG. 4 | Active Ag brz. mtrl. | Vacuum | ○ | ○ |
| SiC(W—Ni) | $Al_2O_3$(W—Ni) | FIG. 1 | Ag brz. mtrl. | Hydrogen | x | x |
| SiC(W—Ni) | $Al_2O_3$(W—Ni) | FIG. 2 | Ag brz. mtrl. | Hydrogen | x | x |
| SiC(W—Ni) | $Al_2O_3$(W—Ni) | FIG. 3 | Ag brz. mtrl. | Hydrogen | x | x |
| SiC(W—Ni) | $Al_2O_3$(W—Ni) | FIG. 4 | Ag brz. mtrl. | Hydrogen | x | x |
| SiC(W—Ni) | $Al_2O_3$(W—Ni) | FIG. 1 | Au brz. mtrl. | Nitrogen | x | x |

TABLE XXIII-continued

| Joining member 1 | Joining member 2 | Form | Bonding agent | Bonding atmosphere | Tensile strength (kgf) | Bending strength (kgf) |
|---|---|---|---|---|---|---|
| SiC(W—Ni) | Al₂O₃(W—Ni) | FIG. 2 | Au brz. mtrl. | Nitrogen | x | x |
| SiC(W—Ni) | Al₂O₃(W—Ni) | FIG. 3 | Au brz. mtrl. | Nitrogen | x | x |
| SiC(W—Ni) | Al₂O₃(W—Ni) | FIG. 4 | Au brz. mtrl. | Nitrogen | x | x |

Table XXIV.

TABLE XXIV

| Joining member 1 | Joining member 2 | Form | Bonding agent | Bonding atmosphere | Tensile strength (kgf) | Bending strength (kgf) |
|---|---|---|---|---|---|---|
| Al₂O₃ | AlN | FIG. 1 | Glass 1 | Air | ○ | x |
| Al₂O₃ | AlN | FIG. 2 | Glass 1 | Air | ○ | ○ |
| Al₂O₃ | AlN | FIG. 3 | Glass 1 | Air | ○ | ○ |
| Al₂O₃ | AlN | FIG. 4 | Glass 1 | Air | ○ | ○ |
| Al₂O₃ | AlN | FIG. 1 | Glass 2 | Air | ○ | x |
| Al₂O₃ | AlN | FIG. 2 | Glass 2 | Air | ○ | ○ |
| Al₂O₃ | AlN | FIG. 3 | Glass 2 | Air | ○ | ○ |
| Al₂O₃ | AlN | FIG. 4 | Glass 2 | Air | ○ | ○ |
| Al₂O₃ | AlN | FIG. 1 | Active Ag brz. mtrl. | Vacuum | ○ | x |
| Al₂O₃ | AlN | FIG. 2 | Active Ag brz. mtrl. | Vacuum | ○ | Δ |
| Al₂O₃ | AlN | FIG. 3 | Active Ag brz. mtrl. | Vacuum | ○ | ○ |
| Al₂O₃ | AlN | FIG. 4 | Active Ag brz. mtrl. | Vacuum | ○ | ○ |
| Al₂O₃(W—Ni) | AlN(W—Ni) | FIG. 1 | Ag brz. mtrl. | Hydrogen | ○ | x |
| Al₂O₃(W—Ni) | AlN(W—Ni) | FIG. 2 | Ag brz. mtrl. | Hydrogen | ○ | Δ |
| Al₂O₃(W—Ni) | AlN(W—Ni) | FIG. 3 | Ag brz. mtrl. | Hydrogen | ○ | ○ |
| Al₂O₃(W—Ni) | AlN(W—Ni) | FIG. 4 | Ag brz. mtrl. | Hydrogen | ○ | ○ |
| Al₂O₃(W—Ni) | AlN(W—Ni) | FIG. 1 | Au brz. mtrl. | Nitrogen | ○ | x |
| Al₂O₃(W—Ni) | AlN(W—Ni) | FIG. 2 | Au brz. mtrl. | Nitrogen | ○ | Δ |
| Al₂O₃(W—Ni) | AlN(W—Ni) | FIG. 3 | Au brz. mtrl. | Nitrogen | ○ | ○ |
| Al₂O₃(W—Ni) | AlN(W—Ni) | FIG. 4 | Au brz. mtrl. | Nitrogen | ○ | ○ |

Table XXV.

TABLE XXV

| Joining member 1 | Joining member 2 | Form | Bonding agent | Bonding atmosphere | Tensile strength (kgf) | Bending strength (kgf) |
|---|---|---|---|---|---|---|
| Al₂O₃ | Si₃N₄ | FIG. 1 | Glass 1 | Air | ○ | x |
| Al₂O₃ | Si₃N₄ | FIG. 2 | Glass 1 | Air | ○ | ○ |
| Al₂O₃ | Si₃N₄ | FIG. 3 | Glass 1 | Air | ○ | ○ |
| Al₂O₃ | Si₃N₄ | FIG. 4 | Glass 1 | Air | ○ | ○ |
| Al₂O₃ | Si₃N₄ | FIG. 1 | Glass 2 | Air | ○ | x |
| Al₂O₃ | Si₃N₄ | FIG. 2 | Glass 2 | Air | ○ | ○ |
| Al₂O₃ | Si₃N₄ | FIG. 3 | Glass 2 | Air | ○ | ○ |
| Al₂O₃ | Si₃N₄ | FIG. 4 | Glass 2 | Air | ○ | ○ |
| Al₂O₃ | Si₃N₄ | FIG. 1 | Active Ag brz. mtrl. | Vacuum | ○ | x |
| Al₂O₃ | Si₃N₄ | FIG. 2 | Active Ag brz. mtrl. | Vacuum | ○ | Δ |
| Al₂O₃ | Si₃N₄ | FIG. 3 | Active Ag brz. mtrl. | Vacuum | ○ | ○ |
| Al₂O₃ | Si₃N₄ | FIG. 4 | Active Ag brz. mtrl. | Vacuum | ○ | ○ |

TABLE XXV-continued

| Joining member 1 | Joining member 2 | Form | Bonding agent | Bonding atmosphere | Tensile strength (kgf) | Bending strength (kgf) |
|---|---|---|---|---|---|---|
| Al$_2$O$_3$(W—Ni) | Si$_3$N$_4$(W—Ni) | FIG. 1 | Ag brz. mtrl. | Hydrogen | ○ | x |
| Al$_2$O$_3$(W—Ni) | Si$_3$N$_4$(W—Ni) | FIG. 2 | Ag brz. mtrl. | Hydrogen | ○ | Δ |
| Al$_2$O$_3$(W—Ni) | Si$_3$N$_4$(W—Ni) | FIG. 3 | Ag brz. mtrl. | Hydrogen | ○ | ○ |
| Al$_2$O$_3$(W—Ni) | Si$_3$N$_4$(W—Ni) | FIG. 4 | Ag brz. mtrl. | Hydrogen | ○ | ○ |
| Al$_2$O$_3$(W—Ni) | Si$_3$N$_4$(W—Ni) | FIG. 1 | Au brz. mtrl. | Nitrogen | ○ | x |
| Al$_2$O$_3$(W—Ni) | Si$_3$N$_4$(W—Ni) | FIG. 2 | Au brz. mtrl. | Nitrogen | ○ | Δ |
| Al$_2$O$_3$(W—Ni) | Si$_3$N$_4$(W—Ni) | FIG. 3 | Au brz. mtrl. | Nitrogen | ○ | ○ |
| Al$_2$O$_3$(W—Ni) | Si$_3$N$_4$(W—Ni) | FIG. 4 | Au brz. mtrl. | Nitrogen | ○ | ○ |

Table XXVI.

TABLE XXVI

| Joining member 1 | Joining member 2 | Form | Bonding agent | Bonding atmosphere | Tensile strength (kgf) | Bending strength (kgf) |
|---|---|---|---|---|---|---|
| Al$_2$O$_3$ | W(Ni—Au) | FIG. 1 | Glass 1 | Nitrogen | ○ | x |
| Al$_2$O$_3$ | W(Ni—Au) | FIG. 2 | Glass 1 | Nitrogen | ○ | ○ |
| Al$_2$O$_3$ | W(Ni—Au) | FIG. 3 | Glass 1 | Nitrogen | ○ | ○ |
| Al$_2$O$_3$ | W(Ni—Au) | FIG. 4 | Glass 1 | Nitrogen | ○ | ○ |
| Al$_2$O$_3$ | W(Ni—Au) | FIG. 1 | Glass 2 | Nitrogen | ○ | x |
| Al$_2$O$_3$ | W(Ni—Au) | FIG. 2 | Glass 2 | Nitrogen | ○ | ○ |
| Al$_2$O$_3$ | W(Ni—Au) | FIG. 3 | Glass 2 | Nitrogen | ○ | ○ |
| Al$_2$O$_3$ | W(Ni—Au) | FIG. 4 | Glass 2 | Nitrogen | ○ | ○ |
| Al$_2$O$_3$ | W | FIG. 1 | Active Ag brz. mtrl. | Vacuum | ○ | x |
| Al$_2$O$_3$ | W | FIG. 2 | Active Ag brz. mtrl. | Vacuum | ○ | Δ |
| Al$_2$O$_3$ | W | FIG. 3 | Active Ag brz. mtrl. | Vacuum | ○ | ○ |
| Al$_2$O$_3$ | W | FIG. 4 | Active Ag brz. mtrl. | Vacuum | ○ | ○ |
| Al$_2$O$_3$(W—Ni) | W | FIG. 1 | Ag brz. mtrl. | Hydrogen | ○ | x |
| Al$_2$O$_3$(W—Ni) | W | FIG. 2 | Ag brz. mtrl. | Hydrogen | ○ | Δ |
| Al$_2$O$_3$(W—Ni) | W | FIG. 3 | Ag brz. mtrl. | Hydrogen | ○ | ○ |
| Al$_2$O$_3$(W—Ni) | W | FIG. 4 | Ag brz. mtrl. | Hydrogen | ○ | ○ |
| Al$_2$O$_3$(W—Ni) | W | FIG. 1 | Au brz. mtrl. | Nitrogen | ○ | x |
| Al$_2$O$_3$(W—Ni) | W | FIG. 2 | Au brz. mtrl. | Nitrogen | ○ | Δ |
| Al$_2$O$_3$(W—Ni) | W | FIG. 3 | Au brz. mtrl. | Nitrogen | ○ | ○ |
| Al$_2$O$_3$(W—Ni) | W | FIG. 4 | Au brz. mtrl. | Nitrogen | ○ | ○ |

Table XXVII.

TABLE XXVII

| Joining member 1 | Joining member 2 | Form | Bonding agent | Bonding atmosphere | Tensile strength (kgf) | Bending strength (kgf) |
|---|---|---|---|---|---|---|
| Al$_2$O$_3$ | Mo(Ni—Au) | FIG. 1 | Glass 1 | Nitrogen | ○ | x |
| Al$_2$O$_3$ | Mo(Ni—Au) | FIG. 2 | Glass 1 | Nitrogen | ○ | ○ |

TABLE XXVII-continued

| Joining member 1 | Joining member 2 | Form | Bonding agent | Bonding atmosphere | Tensile strength (kgf) | Bending strength (kgf) |
|---|---|---|---|---|---|---|
| Al$_2$O$_3$ | Mo(Ni—Au) | FIG. 3 | Glass 1 | Nitrogen | ○ | ○ |
| Al$_2$O$_3$ | Mo(Ni—Au) | FIG. 4 | Glass 1 | Nitrogen | ○ | ○ |
| Al$_2$O$_3$ | Mo(Ni—Au) | FIG. 1 | Glass 2 | Nitrogen | ○ | x |
| Al$_2$O$_3$ | Mo(Ni—Au) | FIG. 2 | Glass 2 | Nitrogen | ○ | ○ |
| Al$_2$O$_3$ | Mo(Ni—Au) | FIG. 3 | Glass 2 | Nitrogen | ○ | ○ |
| Al$_2$O$_3$ | Mo(Ni—Au) | FIG. 4 | Glass 2 | Nitrogen | ○ | ○ |
| Al$_2$O$_3$ | Mo | FIG. 1 | Active Ag brz. mtrl. | Vacuum | ○ | x |
| Al$_2$O$_3$ | Mo | FIG. 2 | Active Ag brz. mtrl. | Vacuum | ○ | Δ |
| Al$_2$O$_3$ | Mo | FIG. 3 | Active Ag brz. mtrl. | Vacuum | ○ | ○ |
| Al$_2$O$_3$ | Mo | FIG. 4 | Active Ag brz. mtrl. | Vacuum | ○ | ○ |
| Al$_2$O$_3$(W—Ni) | Mo | FIG. 1 | Ag brz. mtrl. | Hydrogen | ○ | x |
| Al$_2$O$_3$(W—Ni) | Mo | FIG. 2 | Ag brz. mtrl. | Hydrogen | ○ | Δ |
| Al$_2$O$_3$(W—Ni) | Mo | FIG. 3 | Ag brz. mtrl. | Hydrogen | ○ | ○ |
| Al$_2$O$_3$(W—Ni) | Mo | FIG. 4 | Ag brz. mtrl. | Hydrogen | ○ | ○ |
| Al$_2$O$_3$(W—Ni) | Mo | FIG. 1 | Au brz. mtrl. | Nitrogen | ○ | x |
| Al$_2$O$_3$(W—Ni) | Mo | FIG. 2 | Au brz. mtrl. | Nitrogen | ○ | Δ |
| Al$_2$O$_3$(W—Ni) | Mo | FIG. 3 | Au brz. mtrl. | Nitrogen | ○ | ○ |
| Al$_2$O$_3$(W—Ni) | Mo | FIG. 4 | Au brz. mtrl. | Nitrogen | ○ | ○ |

Table XXVIII.

TABLE XXVIII

| Joining member 1 | Joining member 2 | Form | Bonding agent | Bonding atmosphere | Tensile strength (kgf) | Bending strength (kgf) |
|---|---|---|---|---|---|---|
| Al$_2$O$_3$ | Cu—W(Ni—Au) | FIG. 1 | Glass 1 | Nitrogen | ○ | x |
| Al$_2$O$_3$ | Cu—W(Ni—Au) | FIG. 2 | Glass 1 | Nitrogen | ○ | ○ |
| Al$_2$O$_3$ | Cu—W(Ni—Au) | FIG. 3 | Glass 1 | Nitrogen | ○ | ○ |
| Al$_2$O$_3$ | Cu—W(Ni—Au) | FIG. 4 | Glass 1 | Nitrogen | ○ | ○ |
| Al$_2$O$_3$ | Cu—W(Ni—Au) | FIG. 1 | Glass 2 | Nitrogen | ○ | x |
| Al$_2$O$_3$ | Cu—W(Ni—Au) | FIG. 2 | Glass 2 | Nitrogen | ○ | ○ |
| Al$_2$O$_3$ | Cu—W(Ni—Au) | FIG. 3 | Glass 2 | Nitrogen | ○ | ○ |
| Al$_2$O$_3$ | Cu—W(Ni—Au) | FIG. 4 | Glass 2 | Nitrogen | ○ | ○ |
| Al$_2$O$_3$(W—Ni) | Cu—W(Ni) | FIG. 1 | Ag brz. mtrl. | Hydrogen | ○ | x |
| Al$_2$O$_3$(W—Ni) | Cu—W(Ni) | FIG. 2 | Ag brz. mtrl. | Hydrogen | ○ | Δ |
| Al$_2$O$_3$(W—Ni) | Cu—W(Ni) | FIG. 3 | Ag brz. mtrl. | Hydrogen | ○ | ○ |
| Al$_2$O$_3$(W—Ni) | Cu—W(Ni) | FIG 4 | Ag brz. mtrl. | Hydrogen | ○ | ○ |
| Al$_2$O$_3$ | Cu—Mo(Ni—Au) | FIG. 1 | Glass 1 | Nitrogen | ○ | x |
| Al$_2$O$_3$ | Cu—Mo(Ni—Au) | FIG. 2 | Glass 1 | Nitrogen | ○ | ○ |
| Al$_2$O$_3$ | Cu—Mo(Ni—Au) | FIG. 3 | Glass 1 | Nitrogen | ○ | ○ |
| Al$_2$O$_3$ | Cu—Mo(Ni—Au) | FIG. 4 | Glass 1 | Nitrogen | ○ | ○ |
| Al$_2$O$_3$ | Cu—Mo(Ni—Au) | FIG. 1 | Glass 2 | Nitrogen | ○ | x |
| Al$_2$O$_3$ | Cu—Mo(Ni—Au) | FIG. 2 | Glass 2 | Nitrogen | ○ | ○ |
| Al$_2$O$_3$ | Cu—Mo(Ni—Au) | FIG. 3 | Glass 2 | Nitrogen | ○ | ○ |
| Al$_2$O$_3$ | Cu—Mo(Ni—Au) | FIG. 4 | Glass 2 | Nitrogen | ○ | ○ |
| Al$_2$O$_3$(W—Ni) | Cu—Mo(Ni) | FIG. 1 | Ag brz. mtrl. | Hydrogen | ○ | x |
| Al$_2$O$_3$(W—Ni) | Cu—Mo(Ni) | FIG. 2 | Ag brz. mtrl. | Hydrogen | ○ | Δ |
| Al$_2$O$_3$(W—Ni) | Cu—Mo(Ni) | FIG. 3 | Ag brz. mtrl. | Hydrogen | ○ | ○ |
| Al$_2$O$_3$(W—Ni) | Cu—Mo(Ni) | FIG. 4 | Ag brz. mtrl. | Hydrogen | ○ | ○ |

Table XXIX.

TABLE XXIX

| Joining member 1 | Joining member 2 | Form | Bonding agent | Bonding atmosphere | Tensile strength (kgf) | Bending strength (kgf) |
|---|---|---|---|---|---|---|
| $Al_2O_3$ | SiC | FIG. 1 | Glass 1 | Air | ○ | x |
| $Al_2O_3$ | SiC | FIG. 2 | Glass 1 | Air | ○ | ○ |
| $Al_2O_3$ | SiC | FIG. 3 | Glass 1 | Air | ○ | ○ |
| $Al_2O_3$ | SiC | FIG. 4 | Glass 1 | Air | ○ | ○ |
| $Al_2O_3$ | SiC | FIG. 1 | Glass 2 | Air | ○ | x |
| $Al_2O_3$ | SiC | FIG. 2 | Glass 2 | Air | ○ | ○ |
| $Al_2O_3$ | SiC | FIG. 3 | Glass 2 | Air | ○ | ○ |
| $Al_2O_3$ | SiC | FIG. 4 | Glass 2 | Air | ○ | ○ |
| $Al_2O_3$ | SiC | FIG. 1 | Active Ag brz. mtrl. | Vacuum | ○ | x |
| $Al_2O_3$ | SiC | FIG. 2 | Active Ag brz. mtrl. | Vacuum | ○ | Δ |
| $Al_2O_3$ | SiC | FIG. 3 | Active Ag brz. mtrl. | Vacuum | ○ | ○ |
| $Al_2O_3$ | SiC | FIG. 4 | Active Ag brz. mtrl. | Vacuum | ○ | ○ |
| $Al_2O_3$(W—Ni) | SiC(W—Ni) | FIG. 1 | Ag brz. mtrl. | Hydrogen | ○ | x |
| $Al_2O_3$(W—Ni) | SiC(W—Ni) | FIG. 2 | Ag brz. mtrl. | Hydrogen | ○ | Δ |
| $Al_2O_3$(W—Ni) | SiC(W—Ni) | FIG. 3 | Ag brz. mtrl. | Hydrogen | ○ | ○ |
| $Al_2O_3$(W—Ni) | SiC(W—Ni) | FIG. 4 | Ag brz. mtrl. | Hydrogen | ○ | ○ |
| $Al_2O_3$(W—Ni) | SiC(W—Ni) | FIG. 1 | Au brz. mtrl. | Nitrogen | ○ | x |
| $Al_2O_3$(W—Ni) | SiC(W—Ni) | FIG. 2 | Au brz. mtrl. | Nitrogen | ○ | Δ |
| $Al_2O_3$(W—Ni) | SiC(W—Ni) | FIG. 3 | Au brz. mtrl. | Nitrogen | ○ | ○ |
| $Al_2O_3$(W—Ni) | SiC(W—Ni) | FIG. 4 | Au brz. mtrl. | Nitrogen | ○ | ○ |

Table XXX.

TABLE XXX

| Joining member 1 | Joining member 2 | Form | Bonding agent | Bonding atmosphere | Tensile strength (kgf) | Bending strength (kgf) |
|---|---|---|---|---|---|---|
| $Al_2O_3$ | $Al_2O_3$ | FIG. 1 | Glass 1 | Air | ○ | x |
| $Al_2O_3$ | $Al_2O_3$ | FIG. 2 | Glass 1 | Air | ○ | ○ |
| $Al_2O_3$ | $Al_2O_3$ | FIG. 3 | Glass 1 | Air | ○ | ○ |
| $Al_2O_3$ | $Al_2O_3$ | FIG. 4 | Glass 1 | Air | ○ | ○ |
| $Al_2O_3$ | $Al_2O_3$ | FIG. 1 | Glass 2 | Air | ○ | x |
| $Al_2O_3$ | $Al_2O_3$ | FIG. 2 | Glass 2 | Air | ○ | ○ |
| $Al_2O_3$ | $Al_2O_3$ | FIG. 3 | Glass 2 | Air | ○ | ○ |
| $Al_2O_3$ | $Al_2O_3$ | FIG. 4 | Glass 2 | Air | ○ | ○ |
| $Al_2O_3$ | $Al_2O_3$ | FIG. 1 | Active Ag brz. mtrl. | Vacuum | ○ | x |
| $Al_2O_3$ | $Al_2O_3$ | FIG. 2 | Active Ag brz. mtrl. | Vacuum | ○ | Δ |
| $Al_2O_3$ | $Al_2O_3$ | FIG. 3 | Active Ag brz. mtrl. | Vacuum | ○ | ○ |
| $Al_2O_3$ | $Al_2O_3$ | FIG. 4 | Active Ag brz. mtrl. | Vacuum | ○ | ○ |
| $Al_2O_3$(W—Ni) | $Al_2O_3$(W—Ni) | FIG. 1 | Ag brz. mtrl. | Hydrogen | x | x |
| $Al_2O_3$(W—Ni) | $Al_2O_3$(W—Ni) | FIG. 2 | Ag brz. mtrl. | Hydrogen | x | x |
| $Al_2O_3$(W—Ni) | $Al_2O_3$(W—Ni) | FIG. 3 | Ag brz. mtrl. | Hydrogen | x | x |
| $Al_2O_3$(W—Ni) | $Al_2O_3$(W—Ni) | FIG. 4 | Ag brz. mtrl. | Hydrogen | x | x |
| $Al_2O_3$(W—Ni) | $Al_2O_3$(W—Ni) | FIG. 1 | Au brz. mtrl. | Nitrogen | x | x |
| $Al_2O_3$(W—Ni) | $Al_2O_3$(W—Ni) | FIG. 2 | Au brz. mtrl. | Nitrogen | x | x |

TABLE XXX-continued

| Joining member 1 | Joining member 2 | Form | Bonding agent | Bonding atmosphere | Tensile strength (kgf) | Bending strength (kgf) |
|---|---|---|---|---|---|---|
| Al$_2$O$_3$(W—Ni) | Al$_2$O$_3$(W—Ni) | FIG. 3 | Au brz. mtrl. | Nitrogen | x | x |
| Al$_2$O$_3$(W—Ni) | Al$_2$O$_3$(W—Ni) | FIG. 4 | Au brz. mtrl. | Nitrogen | x | x |

Table XXXI.

TABLE XXXI

| Joining member 1 | Joining member 2 | Form | Bonding agent | Bonding atmosphere | Tensile strength (kgf) | Bending strength (kgf) |
|---|---|---|---|---|---|---|
| W(Ni—Au) | AlN | FIG. 1 | Glass 1 | Nitrogen | ○ | x |
| W(Ni—Au) | AlN | FIG. 2 | Glass 1 | Nitrogen | ○ | ○ |
| W(Ni—Au) | AlN | FIG. 3 | Glass 1 | Nitrogen | ○ | ○ |
| W(Ni—Au) | AlN | FIG. 4 | Glass 1 | Nitrogen | ○ | ○ |
| W(Ni—Au) | AlN | FIG. 1 | Glass 2 | Nitrogen | ○ | x |
| W(Ni—Au) | AlN | FIG. 2 | Glass 2 | Nitrogen | ○ | ○ |
| W(Ni—Au) | AlN | FIG. 3 | Glass 2 | Nitrogen | ○ | ○ |
| W(Ni—Au) | AlN | FIG. 4 | Glass 2 | Nitrogen | ○ | ○ |
| W | AlN | FIG. 1 | Active Ag brz. mtrl. | Vacuum | ○ | x |
| W | AlN | FIG. 2 | Active Ag brz. mtrl. | Vacuum | ○ | Δ |
| W | AlN | FIG. 3 | Active Ag brz. mtrl. | Vacuum | ○ | ○ |
| W | AlN | FIG. 4 | Active Ag brz. mtrl. | Vacuum | ○ | ○ |
| W(Ni—Au) | AlN(W—Ni) | FIG. 1 | Ag brz. mtrl. | Hydrogen | ○ | x |
| W(Ni—Au) | AlN(W—Ni) | FIG. 2 | Ag brz. mtrl. | Hydrogen | ○ | Δ |
| W(Ni—Au) | AlN(W—Ni) | FIG. 3 | Ag brz. mtrl. | Hydrogen | ○ | ○ |
| W(Ni—Au) | AlN(W—Ni) | FIG. 4 | Ag brz. mtrl. | Hydrogen | ○ | ○ |
| W | AlN(W—Ni) | FIG. 1 | Au brz. mtrl. | Nitrogen | ○ | x |
| W | AlN(W—Ni) | FIG. 2 | Au brz. mtrl. | Nitrogen | ○ | Δ |
| W | AlN(W—Ni) | FIG. 3 | Au brz. mtrl. | Nitrogen | ○ | ○ |
| W | AlN(W—Ni) | FIG. 4 | Au brz. mtrl. | Nitrogen | ○ | ○ |

Table XXXII.

TABLE XXXII

| Joining member 1 | Joining member 2 | Form | Bonding agent | Bonding atmosphere | Tensile strength (kgf) | Bending strength (kgf) |
|---|---|---|---|---|---|---|
| W(Ni—Au) | Si$_3$N$_4$ | FIG. 1 | Glass 1 | Nitrogen | ○ | x |
| W(Ni—Au) | Si$_3$N$_4$ | FIG. 2 | Glass 1 | Nitrogen | ○ | ○ |
| W(Ni—Au) | Si$_3$N$_4$ | FIG. 3 | Glass 1 | Nitrogen | ○ | ○ |
| W(Ni—Au) | Si$_3$N$_4$ | FIG. 4 | Glass 1 | Nitrogen | ○ | ○ |
| W(Ni—Au) | Si$_3$N$_4$ | FIG. 1 | Glass 2 | Nitrogen | ○ | x |
| W(Ni—Au) | Si$_3$N$_4$ | FIG. 2 | Glass 2 | Nitrogen | ○ | ○ |
| W(Ni—Au) | Si$_3$N$_4$ | FIG. 3 | Glass 2 | Nitrogen | ○ | ○ |
| W(Ni—Au) | Si$_3$N$_4$ | FIG. 4 | Glass 2 | Nitrogen | ○ | ○ |
| W | Si$_3$N$_4$ | FIG. 1 | Active Ag brz. mtrl. | Vacuum | ○ | x |
| W | Si$_3$N$_4$ | FIG. 2 | Active Ag brz. mtrl. | Vacuum | ○ | Δ |
| W | Si$_3$N$_4$ | FIG. 3 | Active Ag brz. mtrl. | Vacuum | ○ | ○ |

TABLE XXXII-continued

| Joining member 1 | Joining member 2 | Form | Bonding agent | Bonding atmosphere | Tensile strength (kgf) | Bending strength (kgf) |
|---|---|---|---|---|---|---|
| W | Si$_3$N$_4$ | FIG. 4 | Active Ag brz. mtrl. | Vacuum | ○ | ○ |
| W | Si$_3$N$_4$(W—Ni) | FIG. 1 | Ag brz. mtrl. | Hydrogen | ○ | x |
| W | Si$_3$N$_4$(W—Ni) | FIG. 2 | Ag brz. mtrl. | Hydrogen | ○ | Δ |
| W | Si$_3$N$_4$(W—Ni) | FIG. 3 | Ag brz. mtrl. | Hydrogen | ○ | ○ |
| W | Si$_3$N$_4$(W—Ni) | FIG. 4 | Ag brz. mtrl. | Hydrogen | ○ | ○ |
| W | Si$_3$N$_4$(W—Ni) | FIG. 1 | Au brz. mtrl. | Nitrogen | ○ | x |
| W | Si$_3$N$_4$(W—Ni) | FIG. 2 | Au brz. mtrl. | Nitrogen | ○ | Δ |
| W | Si$_3$N$_4$(W—Ni) | FIG. 3 | Au brz. mtrl. | Nitrogen | ○ | ○ |
| W | Si$_3$N$_4$(W—Ni) | FIG. 4 | Au brz. mtrl. | Nitrogen | ○ | ○ |

Table XXXIII.

TABLE XXXIII

| Joining member 1 | Joining member 2 | Form | Bonding agent | Bonding atmosphere | Tensile strength (kgf) | Bending strength (kgf) |
|---|---|---|---|---|---|---|
| W(Ni—Au) | W(Ni—Au) | FIG. 1 | Glass 1 | Nitrogen | ○ | x |
| W(Ni—Au) | W(Ni—Au) | FIG. 2 | Glass 1 | Nitrogen | ○ | ○ |
| W(Ni—Au) | W(Ni—Au) | FIG. 3 | Glass 1 | Nitrogen | ○ | ○ |
| W(Ni—Au) | W(Ni—Au) | FIG. 4 | Glass 1 | Nitrogen | ○ | ○ |
| W(Ni—Au) | W(Ni—Au) | FIG. 1 | Glass 2 | Nitrogen | ○ | x |
| W(Ni—Au) | W(Ni—Au) | FIG. 2 | Glass 2 | Nitrogen | ○ | ○ |
| W(Ni—Au) | W(Ni—Au) | FIG. 3 | Glass 2 | Nitrogen | ○ | ○ |
| W(Ni—Au) | W(Ni—Au) | FIG. 4 | Glass 2 | Nitrogen | ○ | ○ |
| W | W | FIG. 1 | Active Ag brz. mtrl. | Vacuum | ○ | x |
| W | W | FIG. 2 | Active Ag brz. mtrl. | Vacuum | ○ | Δ |
| W | W | FIG. 3 | Active Ag brz. mtrl. | Vacuum | ○ | ○ |
| W | W | FIG. 4 | Active Ag brz. mtrl. | Vacuum | ○ | ○ |
| W | W | FIG. 1 | Ag brz. mtrl. | Hydrogen | ○ | x |
| W | W | FIG. 2 | Ag brz. mtrl. | Hydrogen | ○ | Δ |
| W | W | FIG. 3 | Ag brz. mtrl. | Hydrogen | ○ | ○ |
| W | W | FIG. 4 | Ag brz. mtrl. | Hydrogen | ○ | ○ |
| W | W | FIG. 1 | Au brz. mtrl. | Nitrogen | ○ | x |
| W | W | FIG. 2 | Au brz. mtrl. | Nitrogen | ○ | Δ |
| W | W | FIG. 3 | Au brz. mtrl. | Nitrogen | ○ | ○ |
| W | W | FIG. 4 | Au brz. mtrl. | Nitrogen | ○ | ○ |

Table XXXIV.

TABLE XXXIV

| Joining member 1 | Joining member 2 | Form | Bonding agent | Bonding atmosphere | Tensile strength (kgf) | Bending strength (kgf) |
|---|---|---|---|---|---|---|
| W(Ni—Au) | Mo(Ni—Au) | FIG. 1 | Glass 1 | Nitrogen | o | x |
| W(Ni—Au) | Mo(Ni—Au) | FIG. 2 | Glass 1 | Nitrogen | o | o |
| W(Ni—Au) | Mo(Ni—Au) | FIG. 3 | Glass 1 | Nitrogen | o | o |
| W(Ni—Au) | Mo(Ni—Au) | FIG. 4 | Glass 1 | Nitrogen | o | o |
| W(Ni—Au) | Mo(Ni—Au) | FIG. 1 | Glass 2 | Nitrogen | o | x |
| W(Ni—Au) | Mo(Ni—Au) | FIG. 2 | Glass 2 | Nitrogen | o | o |
| W(Ni—Au) | Mo(Ni—Au) | FIG. 3 | Glass 2 | Nitrogen | o | o |
| W(Ni—Au) | Mo(Ni—Au) | FIG. 4 | Glass 2 | Nitrogen | o | o |
| W | Mo | FIG. 1 | Active Ag brz. mtrl. | Vacuum | o | x |
| W | Mo | FIG. 2 | Active Ag brz. mtrl. | Vacuum | o | Δ |
| W | Mo | FIG. 3 | Active Ag brz. mtrl. | Vacuum | o | o |
| W | Mo | FIG. 4 | Active Ag brz. mtrl. | Vacuum | o | o |
| W | Mo | FIG. 1 | Ag brz. mtrl. | Hydrogen | o | x |
| W | Mo | FIG. 2 | Ag brz. mtrl. | Hydrogen | o | Δ |
| W | Mo | FIG. 3 | Ag brz. mtrl. | Hydrogen | o | o |
| W | Mo | FIG. 4 | Ag brz. mtrl. | Hydrogen | o | o |
| W | Mo | FIG. 1 | Au brz. mtrl. | Nitrogen | o | x |
| W | Mo | FIG. 2 | Au brz. mtrl. | Nitrogen | o | Δ |
| W | Mo | FIG. 3 | Au brz. mtrl. | Nitrogen | o | o |
| W | Mo | FIG. 4 | Au brz. mtrl. | Nitrogen | o | o |

Table XXXV.

TABLE XXXV

| Joining member 1 | Joining member 2 | Form | Bonding agent | Bonding atmosphere | Tensile strength (kgf) | Bending strength (kgf) |
|---|---|---|---|---|---|---|
| W(Ni—Au) | Cu—W(Ni—Au) | FIG. 1 | Glass 1 | Nitrogen | o | x |
| W(Ni—Au) | Cu—W(Ni—Au) | FIG. 2 | Glass 1 | Nitrogen | o | o |
| W(Ni—Au) | Cu—W(Ni—Au) | FIG. 3 | Glass 1 | Nitrogen | o | o |
| W(Ni—Au) | Cu—W(Ni—Au) | FIG. 4 | Glass 1 | Nitrogen | o | o |
| W(Ni—Au) | Cu—W(Ni—Au) | FIG. 1 | Glass 2 | Nitrogen | o | x |
| W(Ni—Au) | Cu—W(Ni—Au) | FIG. 2 | Glass 2 | Nitrogen | o | o |
| W(Ni—Au) | Cu—W(Ni—Au) | FIG. 3 | Glass 2 | Nitrogen | o | o |
| W(Ni—Au) | Cu—W(Ni—Au) | FIG. 4 | Glass 2 | Nitrogen | o | o |
| W | Cu—W(Ni) | FIG. 1 | Ag brz. mtrl. | Hydrogen | o | x |
| W | Cu—W(Ni) | FIG. 2 | Ag brz. mtrl. | Hydrogen | o | Δ |
| W | Cu—W(Ni) | FIG. 3 | Ag brz. mtrl. | Hydrogen | o | o |
| W | Cu—W(Ni) | FIG. 4 | Ag brz. mtrl. | Hydrogen | o | o |
| W(Ni—Au) | Cu—Mo(Ni—Au) | FIG. 1 | Glass 1 | Nitrogen | o | x |
| W(Ni—Au) | Cu—Mo(Ni—Au) | FIG. 2 | Glass 1 | Nitrogen | o | o |
| W(Ni—Au) | Cu—Mo(Ni—Au) | FIG. 3 | Glass 1 | Nitrogen | o | o |
| W(Ni—Au) | Cu—Mo(Ni—Au) | FIG. 4 | Glass 1 | Nitrogen | o | o |
| W(Ni—Au) | Cu—Mo(Ni—Au) | FIG. 1 | Glass 2 | Nitrogen | o | x |
| W(Ni—Au) | Cu—Mo(Ni—Au) | FIG. 2 | Glass 2 | Nitrogen | o | o |
| W(Ni—Au) | Cu—Mo(Ni—Au) | FIG. 1 | Glass 2 | Nitrogen | o | o |
| W(Ni—Au) | Cu—Mo(Ni—Au) | FIG. 2 | Glass 2 | Nitrogen | o | o |
| W(Ni—Au) | Cu—Mo(Ni—Au) | FIG. 1 | Ag brz. mtrl. | Hydrogen | o | x |
| W(Ni—Au) | Cu—Mo(Ni—Au) | FIG. 2 | Ag brz. mtrl. | Hydrogen | o | Δ |

TABLE XXXV-continued

| Joining member 1 | Joining member 2 | Form | Bonding agent | Bonding atmosphere | Tensile strength (kgf) | Bending strength (kgf) |
|---|---|---|---|---|---|---|
| W(Ni—Au) | Cu—Mo(Ni—Au) | FIG. 1 | Ag brz. mtrl. | Hydrogen | ○ | ○ |
| W(Ni—Au) | Cu—Mo(Ni—Au) | FIG. 2 | Ag brz. mtrl. | Hydrogen | ○ | ○ |
| W | Cu—Mo | FIG. 1 | Au brz. mtrl. | Nitrogen | ○ | x |
| W | Cu—Mo | FIG. 2 | Au brz. mtrl. | Nitrogen | ○ | Δ |
| W | Cu—Mo | FIG. 3 | Au brz. mtrl. | Nitrogen | ○ | ○ |
| W | Cu—Mo | FIG. 4 | Au brz. mtrl. | Nitrogen | ○ | ○ |

Table XXXVI.

TABLE XXXVI

| Joining member 1 | Joining member 2 | Form | Bonding agent | Bonding atmosphere | Tensile strength (kgf) | Bending strength (kgf) |
|---|---|---|---|---|---|---|
| W(Ni—Au) | SiC | FIG. 1 | Glass 1 | Nitrogen | ○ | x |
| W(Ni—Au) | SiC | FIG. 2 | Glass 1 | Nitrogen | ○ | ○ |
| W(Ni—Au) | SiC | FIG. 3 | Glass 1 | Nitrogen | ○ | ○ |
| W(Ni—Au) | SiC | FIG. 4 | Glass 1 | Nitrogen | ○ | ○ |
| W(Ni—Au) | SiC | FIG. 1 | Glass 2 | Nitrogen | ○ | x |
| W(Ni—Au) | SiC | FIG. 2 | Glass 2 | Nitrogen | ○ | ○ |
| W(Ni—Au) | SiC | FIG. 3 | Glass 2 | Nitrogen | ○ | ○ |
| W(Ni—Au) | SiC | FIG. 4 | Glass 2 | Nitrogen | ○ | ○ |
| W | SiC | FIG. 1 | Active Ag brz. mtrl. | Vacuum | ○ | x |
| W | SiC | FIG. 2 | Active Ag brz. mtrl. | Vacuum | ○ | Δ |
| W | SiC | FIG. 3 | Active Ag brz. mtrl. | Vacuum | ○ | ○ |
| W | SiC | FIG. 4 | Active Ag brz. mtrl. | Vacuum | ○ | ○ |
| W | SiC(W—Ni) | FIG. 1 | Ag brz. mtrl. | Hydrogen | ○ | x |
| W | SiC(W—Ni) | FIG. 2 | Ag brz. mtrl. | Hydrogen | ○ | Δ |
| W | SiC(W—Ni) | FIG. 3 | Ag brz. mtrl. | Hydrogen | ○ | ○ |
| W | SiC(W—Ni) | FIG. 4 | Ag brz. mtrl. | Hydrogen | ○ | ○ |
| W | SiC(W—Ni) | FIG. 1 | Au brz. mtrl. | Nitrogen | ○ | x |
| W | SiC(W—Ni) | FIG. 2 | Au brz. mtrl. | Nitrogen | ○ | Δ |
| W | SiC(W—Ni) | FIG. 3 | Au brz. mtrl. | Nitrogen | ○ | ○ |
| W | SiC(W—Ni) | FIG. 4 | Au brz. mtrl. | Nitrogen | ○ | ○ |

Table XXXVII.

TABLE XXXVII

| Joining member 1 | Joining member 2 | Form | Bonding agent | Bonding atmosphere | Tensile strength (kgf) | Bending strength (kgf) |
|---|---|---|---|---|---|---|
| W(Ni—Au) | $Al_2O_3$ | FIG. 1 | Glass 1 | Nitrogen | ○ | x |
| W(Ni—Au) | $Al_2O_3$ | FIG. 2 | Glass 1 | Nitrogen | ○ | ○ |
| W(Ni—Au) | $Al_2O_3$ | FIG. 3 | Glass 1 | Nitrogen | ○ | ○ |
| W(Ni—Au) | $Al_2O_3$ | FIG. 4 | Glass 1 | Nitrogen | ○ | ○ |
| W(Ni—Au) | $Al_2O_3$ | FIG. 1 | Glass 2 | Nitrogen | ○ | x |
| W(Ni—Au) | $Al_2O_3$ | FIG. 2 | Glass 2 | Nitrogen | ○ | ○ |

TABLE XXXVII-continued

| Joining member 1 | Joining member 2 | Form | Bonding agent | Bonding atmosphere | Tensile strength (kgf) | Bending strength (kgf) |
|---|---|---|---|---|---|---|
| W(Ni—Au) | Al$_2$O$_3$ | FIG. 3 | Glass 2 | Nitrogen | ○ | ○ |
| W(Ni—Au) | Al$_2$O$_3$ | FIG. 4 | Glass 2 | Nitrogen | ○ | ○ |
| W | Al$_2$O$_3$ | FIG. 1 | Active Ag brz. mtrl. | Vacuum | ○ | x |
| W | Al$_2$O$_3$ | FIG. 2 | Active Ag brz. mtrl. | Vacuum | ○ | Δ |
| W | Al$_2$O$_3$ | FIG. 3 | Active Ag brz. mtrl. | Vacuum | ○ | ○ |
| W | Al$_2$O$_3$ | FIG. 4 | Active Ag brz. mtrl. | Vacuum | ○ | ○ |
| W | Al$_2$O$_3$(W—Ni) | FIG. 1 | Ag brz. mtrl. | Hydrogen | x | x |
| W | Al$_2$O$_3$(W—Ni) | FIG. 2 | Ag brz. mtrl. | Hydrogen | x | x |
| W | Al$_2$O$_3$(W—Ni) | FIG. 3 | Ag brz. mtrl. | Hydrogen | x | x |
| W | Al$_2$O$_3$(W—Ni) | FIG. 4 | Ag brz. mtrl. | Hydrogen | x | x |
| W | Al$_2$O$_3$(W—Ni) | FIG. 1 | Au brz. mtrl. | Nitrogen | x | x |
| W | Al$_2$O$_3$(W—Ni) | FIG. 2 | Au brz. mtrl. | Nitrogen | x | x |
| W | Al$_2$O$_3$(W—Ni) | FIG. 3 | Au brz. mtrl. | Nitrogen | x | x |
| W | Al$_2$O$_3$(W—Ni) | FIG. 4 | Au brz. mtrl. | Nitrogen | x | x |

Table XXXVIII.

TABLE XXXVIII

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | AlN | FIG. 1 | Glass 1 | Nitrogen | ○ | x |
| Mo(Ni—Au) | AlN | FIG. 2 | Glass 1 | Nitrogen | ○ | ○ |
| Mo(Ni—Au) | AlN | FIG. 3 | Glass 1 | Nitrogen | ○ | ○ |
| Mo(Ni—Au) | AlN | FIG. 4 | Glass 1 | Nitrogen | ○ | ○ |
| Mo(Ni—Au) | AlN | FIG. 1 | Glass 2 | Nitrogen | ○ | x |
| Mo(Ni—Au) | AlN | FIG. 2 | Glass 2 | Nitrogen | ○ | ○ |
| Mo(Ni—Au) | AlN | FIG. 3 | Glass 2 | Nitrogen | ○ | ○ |
| Mo(Ni—Au) | AlN | FIG. 4 | Glass 2 | Nitrogen | ○ | ○ |
| Mo | AlN | FIG. 1 | Active Ag brz. mtrl. | Vacuum | ○ | x |
| Mo | AlN | FIG. 2 | Active Ag brz. mtrl. | Vacuum | ○ | Δ |
| Mo | AlN | FIG. 3 | Active Ag brz. mtrl. | Vacuum | ○ | ○ |
| Mo | AlN | FIG. 4 | Active Ag brz. mtrl. | Vacuum | ○ | ○ |
| Mo(Ni—Au) | AlN(W—Ni) | FIG. 1 | Ag brz. mtrl. | Hydrogen | ○ | x |
| Mo(Ni—Au) | AlN(W—Ni) | FIG. 2 | Ag brz. mtrl. | Hydrogen | ○ | Δ |
| Mo(Ni—Au) | AlN(W—Ni) | FIG. 3 | Ag brz. mtrl. | Hydrogen | ○ | ○ |
| Mo(Ni—Au) | AlN(W—Ni) | FIG. 4 | Ag brz. mtrl. | Hydrogen | ○ | ○ |
| Mo | AlN(W—Ni) | FIG. 1 | Au brz. mtrl. | Nitrogen | ○ | x |
| Mo | AlN(W—Ni) | FIG. 2 | Au brz. mtrl. | Nitrogen | ○ | Δ |
| Mo | AlN(W—Ni) | FIG. 3 | Au brz. mtrl. | Nitrogen | ○ | ○ |
| Mo | AlN(W—Ni) | FIG. 4 | Au brz. mtrl. | Nitrogen | ○ | ○ |

Table XXXIX.

TABLE XXXIX

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | Si$_3$N$_4$ | FIG. 1 | Glass 1 | Nitrogen | ○ | x |
| Mo(Ni—Au) | Si$_3$N$_4$ | FIG. 2 | Glass 1 | Nitrogen | ○ | ○ |
| Mo(Ni—Au) | Si$_3$N$_4$ | FIG. 3 | Glass 1 | Nitrogen | ○ | ○ |
| Mo(Ni—Au) | Si$_3$N$_4$ | FIG. 4 | Glass 1 | Nitrogen | ○ | ○ |
| Mo(Ni—Au) | Si$_3$N$_4$ | FIG. 1 | Glass 2 | Nitrogen | ○ | x |
| Mo(Ni—Au) | Si$_3$N$_4$ | FIG. 2 | Glass 2 | Nitrogen | ○ | ○ |
| Mo(Ni—Au) | Si$_3$N$_4$ | FIG. 3 | Glass 2 | Nitrogen | ○ | ○ |
| Mo(Ni—Au) | Si$_3$N$_4$ | FIG. 4 | Glass 2 | Nitrogen | ○ | ○ |
| Mo | Si$_3$N$_4$ | FIG. 1 | Active Ag brz. mtrl. | Vacuum | ○ | x |
| Mo | Si$_3$N$_4$ | FIG. 2 | Active Ag brz. mtrl. | Vacuum | ○ | Δ |
| Mo | Si$_3$N$_4$ | FIG. 3 | Active Ag brz. mtrl. | Vacuum | ○ | ○ |
| Mo | Si$_3$N$_4$ | FIG. 4 | Active Ag brz. mtrl. | Vacuum | ○ | ○ |
| Mo | Si$_3$N$_4$ | FIG. 1 | Ag brz. mtrl. | Hydrogen | ○ | x |
| Mo | Si$_3$N$_4$(W—Ni) | FIG. 2 | Ag brz. mtrl. | Hydrogen | ○ | Δ |
| Mo | Si$_3$N$_4$(W—Ni) | FIG. 3 | Ag brz. mtrl. | Hydrogen | ○ | ○ |
| Mo | Si$_3$N$_4$(W—Ni) | FIG. 4 | Ag brz. mtrl. | Hydrogen | ○ | ○ |
| Mo | Si$_3$N$_4$(W—Ni) | FIG. 1 | Au brz. mtrl. | Nitrogen | ○ | x |
| Mo | Si$_3$N$_4$(W—Ni) | FIG. 2 | Au brz. mtrl. | Nitrogen | ○ | Δ |
| Mo | Si$_3$N$_4$(W—Ni) | FIG. 3 | Au brz. mtrl. | Nitrogen | ○ | ○ |
| Mo | Si$_3$N$_4$(W—Ni) | FIG. 4 | Au brz. mtrl. | Nitrogen | ○ | ○ |

Table XL.

TABLE XL

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | W(Ni—Au) | FIG. 1 | Glass 1 | Nitrogen | ○ | x |
| Mo(Ni—Au) | W(Ni—Au) | FIG. 2 | Glass 1 | Nitrogen | ○ | ○ |
| Mo(Ni—Au) | W(Ni—Au) | FIG. 3 | Glass 1 | Nitrogen | ○ | ○ |
| Mo(Ni—Au) | W(Ni—Au) | FIG. 4 | Glass 1 | Nitrogen | ○ | ○ |
| Mo(Ni—Au) | W(Ni—Au) | FIG. 1 | Glass 2 | Nitrogen | ○ | x |
| Mo(Ni—Au) | W(Ni—Au) | FIG. 2 | Glass 2 | Nitrogen | ○ | ○ |
| Mo(Ni—Au) | W(Ni—Au) | FIG. 3 | Glass 2 | Nitrogen | ○ | ○ |
| Mo(Ni—Au) | W(Ni—Au) | FIG. 4 | Glass 2 | Nitrogen | ○ | ○ |
| Mo | W | FIG. 1 | Active Ag brz. mtrl. | Vacuum | ○ | x |
| Mo | W | FIG. 2 | Active Ag brz. mtrl. | Vacuum | ○ | Δ |
| Mo | W | FIG. 3 | Active Ag brz. mtrl. | Vacuum | ○ | ○ |
| Mo | W | FIG. 4 | Active Ag brz. mtrl. | Vacuum | ○ | ○ |
| Mo | W | FIG. 1 | Ag brz. mtrl. | Hydrogen | ○ | x |
| Mo | W | FIG. 2 | Ag brz. mtrl. | Hydrogen | ○ | Δ |
| Mo | W | FIG. 3 | Ag brz. mtrl. | Hydrogen | ○ | ○ |
| Mo | W | FIG. 4 | Ag brz. mtrl. | Hydrogen | ○ | ○ |
| Mo | W | FIG. 1 | Au brz. mtrl. | Nitrogen | ○ | x |
| Mo | W | FIG. 2 | Au brz. mtrl. | Nitrogen | ○ | Δ |
| Mo | W | FIG. 3 | Au brz. mtrl. | Nitrogen | ○ | ○ |
| Mo | W | FIG. 4 | Au brz. mtrl. | Nitrogen | ○ | ○ |

Table XLI.

TABLE XLI

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | Mo(Ni—Au) | FIG. 1 | Glass 1 | Nitrogen | ○ | x |
| Mo(Ni—Au) | Mo(Ni—Au) | FIG. 2 | Glass 1 | Nitrogen | ○ | ○ |
| Mo(Ni—Au) | Mo(Ni—Au) | FIG. 3 | Glass 1 | Nitrogen | ○ | ○ |
| Mo(Ni—Au) | Mo(Ni—Au) | FIG. 4 | Glass 1 | Nitrogen | ○ | ○ |
| Mo(Ni—Au) | Mo(Ni—Au) | FIG. 1 | Glass 2 | Nitrogen | ○ | x |
| Mo(Ni—Au) | Mo(Ni—Au) | FIG. 2 | Glass 2 | Nitrogen | ○ | ○ |
| Mo(Ni—Au) | Mo(Ni—Au) | FIG. 3 | Glass 2 | Nitrogen | ○ | ○ |
| Mo(Ni—Au) | Mo(Ni—Au) | FIG. 4 | Glass 2 | Nitrogen | ○ | ○ |
| Mo | Mo | FIG. 1 | Active Ag brz. mtrl. | Vacuum | ○ | x |
| Mo | Mo | FIG. 2 | Active Ag brz. mtrl. | Vacuum | ○ | Δ |
| Mo | Mo | FIG. 3 | Active Ag brz. mtrl. | Vacuum | ○ | ○ |
| Mo | Mo | FIG. 4 | Active Ag brz. mtrl. | Vacuum | ○ | ○ |
| Mo | Mo | FIG. 1 | Ag brz. mtrl. | Hydrogen | ○ | x |
| Mo | Mo | FIG. 2 | Ag brz. mtrl. | Hydrogen | ○ | Δ |
| Mo | Mo | FIG. 3 | Ag brz. mtrl. | Hydrogen | ○ | ○ |
| Mo | Mo | FIG. 4 | Ag brz. mtrl. | Hydrogen | ○ | ○ |
| Mo | Mo | FIG. 1 | Au brz. mtrl. | Nitrogen | ○ | x |
| Mo | Mo | FIG. 2 | Au brz. mtrl. | Nitrogen | ○ | Δ |
| Mo | Mo | FIG. 3 | Au brz. mtrl. | Nitrogen | ○ | ○ |
| Mo | Mo | FIG. 4 | Au brz. mtrl. | Nitrogen | ○ | ○ |

Table XLII.

TABLE XLII

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | Cu—W(Ni—Au) | FIG. 1 | Glass 1 | Nitrogen | ○ | x |
| Mo(Ni—Au) | Cu—W(Ni—Au) | FIG. 2 | Glass 1 | Nitrogen | ○ | ○ |
| Mo(Ni—Au) | Cu—W(Ni—Au) | FIG. 3 | Glass 1 | Nitrogen | ○ | ○ |
| Mo(Ni—Au) | Cu—W(Ni—Au) | FIG. 4 | Glass 1 | Nitrogen | ○ | ○ |
| Mo(Ni—Au) | Cu—W(Ni—Au) | FIG. 1 | Glass 2 | Nitrogen | ○ | x |
| Mo(Ni—Au) | Cu—W(Ni—Au) | FIG. 2 | Glass 2 | Nitrogen | ○ | ○ |
| Mo(Ni—Au) | Cu—W(Ni—Au) | FIG. 3 | Glass 2 | Nitrogen | ○ | ○ |
| Mo(Ni—Au) | Cu—W(Ni—Au) | FIG. 4 | Glass 2 | Nitrogen | ○ | ○ |
| Mo | Cu—W | FIG. 1 | Active Ag brz. mtrl. | Vacuum | ○ | x |
| Mo | Cu—W | FIG. 2 | Active Ag brz. mtrl. | Vacuum | ○ | Δ |
| Mo | Cu—W | FIG. 3 | Active Ag brz. mtrl. | Vacuum | ○ | ○ |
| Mo | Cu—W | FIG. 4 | Active Ag brz. mtrl. | Vacuum | ○ | ○ |
| Mo | Cu—W | FIG. 1 | Ag brz. mtrl. | Hydrogen | ○ | x |
| Mo | Cu—W | FIG. 2 | Ag brz. mtrl. | Hydrogen | ○ | Δ |
| Mo | Cu—W | FIG. 3 | Ag brz. mtrl. | Hydrogen | ○ | ○ |
| Mo | Cu—W | FIG. 4 | Ag brz. mtrl. | Hydrogen | ○ | ○ |
| Mo(Ni—Au) | Cu—Mo(Ni—Au) | FIG. 1 | Glass 1 | Nitrogen | ○ | x |
| Mo(Ni—Au) | Cu—Mo(Ni—Au) | FIG. 2 | Glass 1 | Nitrogen | ○ | ○ |
| Mo(Ni—Au) | Cu—Mo(Ni—Au) | FIG. 3 | Glass 1 | Nitrogen | ○ | ○ |
| Mo(Ni—Au) | Cu—Mo(Ni—Au) | FIG. 4 | Glass 1 | Nitrogen | ○ | ○ |
| Mo(Ni—Au) | Cu—Mo(Ni—Au) | FIG. 1 | Glass 2 | Nitrogen | ○ | x |
| Mo(Ni—Au) | Cu—Mo(Ni—Au) | FIG. 2 | Glass 2 | Nitrogen | ○ | ○ |
| Mo(Ni—Au) | Cu—Mo(Ni—Au) | FIG. 3 | Glass 2 | Nitrogen | ○ | ○ |
| Mo(Ni—Au) | Cu—Mo(Ni—Au) | FIG. 4 | Glass 2 | Nitrogen | ○ | ○ |
| Mo(Ni—Au) | Cu—Mo(Ni—Au) | FIG. 1 | Ag brz. mtrl. | Hydrogen | ○ | x |
| Mo(Ni—Au) | Cu—Mo(Ni—Au) | FIG. 2 | Ag brz. mtrl. | Hydrogen | ○ | Δ |

TABLE XLII-continued

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | Cu—Mo(Ni—Au) | FIG. 3 | Ag brz. mtrl. | Hydrogen | ○ | ○ |
| Mo(Ni—Au) | Cu—Mo(Ni—Au) | FIG. 4 | Ag brz. mtrl. | Hydrogen | ○ | ○ |

Table XLIII.

TABLE XLIII

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | SiC | FIG. 1 | Glass 1 | Nitrogen | ○ | x |
| Mo(Ni—Au) | SiC | FIG. 2 | Glass 1 | Nitrogen | ○ | ○ |
| Mo(Ni—Au) | SiC | FIG. 3 | Glass 1 | Nitrogen | ○ | ○ |
| Mo(Ni—Au) | SiC | FIG. 4 | Glass 1 | Nitrogen | ○ | ○ |
| Mo(Ni—Au) | SiC | FIG. 1 | Glass 2 | Nitrogen | ○ | x |
| Mo(Ni—Au) | SiC | FIG. 2 | Glass 2 | Nitrogen | ○ | ○ |
| Mo(Ni—Au) | SiC | FIG. 3 | Glass 2 | Nitrogen | ○ | ○ |
| Mo(Ni—Au) | SiC | FIG. 4 | Glass 2 | Nitrogen | ○ | ○ |
| Mo | SiC | FIG. 1 | Active Ag brz. mtrl. | Vacuum | ○ | x |
| Mo | SiC | FIG. 2 | Active Ag brz. mtrl. | Vacuum | ○ | Δ |
| Mo | SiC | FIG. 3 | Active Ag brz. mtrl. | Vacuum | ○ | ○ |
| Mo | SiC | FIG. 4 | Active Ag brz. mtrl. | Vacuum | ○ | ○ |
| Mo | SiC(W—Ni) | FIG. 1 | Ag brz. mtrl. | Hydrogen | ○ | x |
| Mo | SiC(W—Ni) | FIG. 2 | Ag brz. mtrl. | Hydrogen | ○ | Δ |
| Mo | SiC(W—Ni) | FIG. 3 | Ag brz. mtrl. | Hydrogen | ○ | ○ |
| Mo | SiC(W—Ni) | FIG. 4 | Ag brz. mtrl. | Hydrogen | ○ | ○ |
| Mo | SiC(W—Ni) | FIG. 1 | Ag brz. mtrl. | Nitrogen | ○ | x |
| Mo | SiC(W—Ni) | FIG. 2 | Ag brz. mtrl. | Nitrogen | ○ | Δ |
| Mo | SiC(W—Ni) | FIG. 3 | Ag brz. mtrl. | Nitrogen | ○ | ○ |
| Mo | SiC(W—Ni) | FIG. 4 | Ag brz. mtrl. | Nitrogen | ○ | ○ |

Table XLIV.

TABLE XLIV

| Joining member 1 | Joining member 2 | Form | Bonding agent | Bonding atmosphere | Tensile strength (kgf) | Bending strength (kgf) |
|---|---|---|---|---|---|---|
| Mo(Ni—Au) | Al$_2$O$_3$ | FIG. 1 | Glass 1 | Nitrogen | ○ | x |
| Mo(Ni—Au) | Al$_2$O$_3$ | FIG. 2 | Glass 1 | Nitrogen | ○ | ○ |
| Mo(Ni—Au) | Al$_2$O$_3$ | FIG. 3 | Glass 1 | Nitrogen | ○ | ○ |
| Mo(Ni—Au) | Al$_2$O$_3$ | FIG. 4 | Glass 1 | Nitrogen | ○ | ○ |
| Mo(Ni—Au) | Al$_2$O$_3$ | FIG. 1 | Glass 2 | Nitrogen | ○ | x |
| Mo(Ni—Au) | Al$_2$O$_3$ | FIG. 2 | Glass 2 | Nitrogen | ○ | ○ |
| Mo(Ni—Au) | Al$_2$O$_3$ | FIG. 3 | Glass 2 | Nitrogen | ○ | ○ |
| Mo(Ni—Au) | Al$_2$O$_3$ | FIG. 4 | Glass 2 | Nitrogen | ○ | ○ |
| Mo | Al$_2$O$_3$ | FIG. 1 | Active Ag brz. mtrl. | Vacuum | ○ | x |
| Mo | Al$_2$O$_3$ | FIG. 2 | Active Ag brz. mtrl. | Vacuum | ○ | Δ |
| Mo | Al$_2$O$_3$ | FIG. 3 | Active Ag brz. mtrl. | Vacuum | ○ | ○ |
| Mo | Al$_2$O$_3$ | FIG. 4 | Active Ag brz. mtrl. | Vacuum | ○ | ○ |
| Mo | Al$_2$O$_3$(W—Ni) | FIG. 1 | Ag brz. mtrl. | Hydrogen | x | x |
| Mo | Al$_2$O$_3$(W—Ni) | FIG. 2 | Ag brz. mtrl. | Hydrogen | x | x |
| Mo | Al$_2$O$_3$(W—Ni) | FIG. 3 | Ag brz. mtrl. | Hydrogen | x | x |
| Mo | Al$_2$O$_3$(W—Ni) | FIG. 4 | Ag brz. mtrl. | Hydrogen | x | x |
| Mo | Al$_2$O$_3$(W—Ni) | FIG. 1 | Ag brz. mtrl. | Nitrogen | x | x |
| Mo | Al$_2$O$_3$(W—Ni) | FIG. 2 | Ag brz. mtrl. | Nitrogen | x | x |

TABLE XLIV-continued

| Joining member 1 | Joining member 2 | Form | Bonding agent | Bonding atmosphere | Tensile strength (kgf) | Bending strength (kgf) |
|---|---|---|---|---|---|---|
| Mo | Al$_2$O$_3$(W—Ni) | FIG. 3 | Ag brz. mtrl. | Nitrogen | x | x |
| Mo | Al$_2$O$_3$(W—Ni) | FIG. 4 | Ag brz. mtrl. | Nitrogen | x | x |

Table XLV.

TABLE XLV

| Joining member 1 | Joining member 2 | Form | Bonding agent | Bonding atmosphere | Tensile strength (kgf) | Bending strength (kgf) |
|---|---|---|---|---|---|---|
| Cu—W(Ni—Au) | AlN | FIG. 1 | Glass 1 | Nitrogen | ○ | x |
| Cu—W(Ni—Au) | AlN | FIG. 2 | Glass 1 | Nitrogen | ○ | ○ |
| Cu—W(Ni—Au) | AlN | FIG. 3 | Glass 1 | Nitrogen | ○ | ○ |
| Cu—W(Ni—Au) | AlN | FIG. 4 | Glass 1 | Nitrogen | ○ | ○ |
| Cu—W(Ni—Au) | AlN | FIG. 1 | Glass 2 | Nitrogen | ○ | x |
| Cu—W(Ni—Au) | AlN | FIG. 2 | Glass 2 | Nitrogen | ○ | ○ |
| Cu—W(Ni—Au) | AlN | FIG. 3 | Glass 2 | Nitrogen | ○ | ○ |
| Cu—W(Ni—Au) | AlN | FIG. 4 | Glass 2 | Nitrogen | ○ | ○ |
| Cu—W(Ni—Au) | AlN(W—Ni) | FIG. 1 | Ag brz. mtrl. | Hydrogen | ○ | x |
| Cu—W(Ni—Au) | AlN(W—Ni) | FIG. 2 | Ag brz. mtrl. | Hydrogen | ○ | Δ |
| Cu—W(Ni—Au) | AlN(W—Ni) | FIG. 3 | Ag brz. mtrl. | Hydrogen | ○ | ○ |
| Cu—W(Ni—Au) | AlN(W—Ni) | FIG. 4 | Ag brz. mtrl. | Hydrogen | ○ | ○ |
| Cu—W(Ni—Au) | Si3N4 | FIG. 1 | Glass 1 | Nitrogen | ○ | x |
| Cu—W(Ni—Au) | Si3N4 | FIG. 2 | Glass 1 | Nitrogen | ○ | ○ |
| Cu—W(Ni—Au) | Si3N4 | FIG. 3 | Glass 1 | Nitrogen | ○ | ○ |
| Cu—W(Ni—Au) | Si3N4 | FIG. 4 | Glass 1 | Nitrogen | ○ | ○ |
| Cu—W(Ni—Au) | Si3N4 | FIG. 1 | Glass 2 | Nitrogen | ○ | x |
| Cu—W(Ni—Au) | Si3N4 | FIG. 2 | Glass 2 | Nitrogen | ○ | ○ |
| Cu—W(Ni—Au) | Si3N4 | FIG. 3 | Glass 2 | Nitrogen | ○ | ○ |
| Cu—W(Ni—Au) | Si3N4 | FIG. 4 | Glass 2 | Nitrogen | ○ | ○ |
| Cu—W(Ni) | Si3N4(W—Ni) | FIG. 1 | Ag brz. mtrl. | Hydrogen | ○ | x |
| Cu—W(Ni) | Si3N4(W—Ni) | FIG. 2 | Ag brz. mtrl. | Hydrogen | ○ | Δ |
| Cu—W(Ni) | Si3N4(W—Ni) | FIG. 3 | Ag brz. mtrl. | Hydrogen | ○ | ○ |
| Cu—W(Ni) | Si3N4(W—Ni) | FIG. 4 | Ag brz. mtrl. | Hydrogen | ○ | ○ |

Table XLVI.

TABLE XLVI

| Joining member 1 | Joining member 2 | Form | Bonding agent | Bonding atmosphere | Tensile strength (kgf) | Bending strength (kgf) |
|---|---|---|---|---|---|---|
| Cu—W(Ni—Au) | W(Ni—Au) | FIG. 1 | Glass 1 | Nitrogen | ○ | x |
| Cu—W(Ni—Au) | W(Ni—Au) | FIG. 2 | Glass 1 | Nitrogen | ○ | ○ |
| Cu—W(Ni—Au) | W(Ni—Au) | FIG. 3 | Glass 1 | Nitrogen | ○ | ○ |
| Cu—W(Ni—Au) | W(Ni—Au) | FIG. 4 | Glass 1 | Nitrogen | ○ | ○ |
| Cu—W(Ni—Au) | W(Ni—Au) | FIG. 1 | Glass 2 | Nitrogen | ○ | x |
| Cu—W(Ni—Au) | W(Ni—Au) | FIG. 2 | Glass 2 | Nitrogen | ○ | ○ |
| Cu—W(Ni—Au) | W(Ni—Au) | FIG. 3 | Glass 2 | Nitrogen | ○ | ○ |
| Cu—W(Ni—Au) | W(Ni—Au) | FIG. 4 | Glass 2 | Nitrogen | ○ | ○ |
| Cu—W(Ni) | W(Ni) | FIG. 1 | Ag brz. mtrl. | Hydrogen | ○ | x |
| Cu—W(Ni) | W(Ni) | FIG. 2 | Ag brz. mtrl. | Hydrogen | ○ | Δ |
| Cu—W(Ni) | W(Ni) | FIG. 3 | Ag brz. mtrl. | Hydrogen | ○ | ○ |
| Cu—W(Ni) | W(Ni) | FIG. 4 | Ag brz. mtrl. | Hydrogen | ○ | ○ |

TABLE XLVI-continued

| Joining member 1 | Joining member 2 | Form | Bonding agent | Bonding atmosphere | Tensile strength (kgf) | Bending strength (kgf) |
|---|---|---|---|---|---|---|
| Cu—W(Ni—Au) | Mo(Ni—Au) | FIG. 1 | Glass 1 | Nitrogen | ○ | x |
| Cu—W(Ni—Au) | Mo(Ni—Au) | FIG. 2 | Glass 1 | Nitrogen | ○ | ○ |
| Cu—W(Ni—Au) | Mo(Ni—Au) | FIG. 3 | Glass 1 | Nitrogen | ○ | ○ |
| Cu—W(Ni—Au) | Mo(Ni—Au) | FIG. 4 | Glass 1 | Nitrogen | ○ | ○ |
| Cu—W(Ni—Au) | Mo(Ni—Au) | FIG. 1 | Glass 2 | Nitrogen | ○ | x |
| Cu—W(Ni—Au) | Mo(Ni—Au) | FIG. 2 | Glass 2 | Nitrogen | ○ | ○ |
| Cu—W(Ni—Au) | Mo(Ni—Au) | FIG. 3 | Glass 2 | Nitrogen | ○ | ○ |
| Cu—W(Ni—Au) | Mo(Ni—Au) | FIG. 4 | Glass 2 | Nitrogen | ○ | ○ |
| Cu—W(Ni) | Mo(Ni) | FIG. 1 | Ag brz. mtrl. | Hydrogen | ○ | x |
| Cu—W(Ni) | Mo(Ni) | FIG. 2 | Ag brz. mtrl. | Hydrogen | ○ | Δ |
| Cu—W(Ni) | Mo(Ni) | FIG. 3 | Ag brz. mtrl. | Hydrogen | ○ | ○ |
| Cu—W(Ni) | Mo(Ni) | FIG. 4 | Ag brz. mtrl. | Hydrogen | ○ | ○ |

Table XLVII.

TABLE XLVII

| Joining member 1 | Joining member 2 | Form | Bonding agent | Bonding atmosphere | Tensile strength (kgf) | Bending strength (kgf) |
|---|---|---|---|---|---|---|
| Cu—W(Ni—Au) | Cu—W(Ni—Au) | FIG. 1 | Glass 1 | Nitrogen | ○ | x |
| Cu—W(Ni—Au) | Cu—W(Ni—Au) | FIG. 2 | Glass 1 | Nitrogen | ○ | ○ |
| Cu—W(Ni—Au) | Cu—W(Ni—Au) | FIG. 3 | Glass 1 | Nitrogen | ○ | ○ |
| Cu—W(Ni—Au) | Cu—W(Ni—Au) | FIG. 4 | Glass 1 | Nitrogen | ○ | ○ |
| Cu—W(Ni—Au) | Cu—W(Ni—Au) | FIG. 1 | Glass 2 | Nitrogen | ○ | x |
| Cu—W(Ni—Au) | Cu—W(Ni—Au) | FIG. 2 | Glass 2 | Nitrogen | ○ | ○ |
| Cu—W(Ni—Au) | Cu—W(Ni—Au) | FIG. 3 | Glass 2 | Nitrogen | ○ | ○ |
| Cu—W(Ni—Au) | Cu—W(Ni—Au) | FIG. 4 | Glass 2 | Nitrogen | ○ | ○ |
| Cu—W(Ni—Au) | Cu—W(Ni—Au) | FIG. 1 | Ag brz. mtrl. | Hydrogen | ○ | x |
| Cu—W(Ni—Au) | Cu—W(Ni—Au) | FIG. 2 | Ag brz. mtrl. | Hydrogen | ○ | Δ |
| Cu—W(Ni—Au) | Cu—W(Ni—Au) | FIG. 3 | Ag brz. mtrl. | Hydrogen | ○ | ○ |
| Cu—W(Ni—Au) | Cu—W(Ni—Au) | FIG. 4 | Ag brz. mtrl. | Hydrogen | ○ | ○ |
| Cu—W(Ni—Au) | Cu—Mo(Ni—Au) | FIG. 1 | Glass 1 | Nitrogen | ○ | x |
| Cu—W(Ni—Au) | Cu—Mo(Ni—Au) | FIG. 2 | Glass 1 | Nitrogen | ○ | ○ |
| Cu—W(Ni—Au) | Cu—Mo(Ni—Au) | FIG. 3 | Glass 1 | Nitrogen | ○ | ○ |
| Cu—W(Ni—Au) | Cu—Mo(Ni—Au) | FIG. 4 | Glass 1 | Nitrogen | ○ | ○ |
| Cu—W(Ni—Au) | Cu—Mo(Ni—Au) | FIG. 1 | Glass 2 | Nitrogen | ○ | x |
| Cu—W(Ni—Au) | Cu—Mo(Ni—Au) | FIG. 2 | Glass 2 | Nitrogen | ○ | ○ |
| Cu—W(Ni—Au) | Cu—Mo(Ni—Au) | FIG. 3 | Glass 2 | Nitrogen | ○ | ○ |
| Cu—W(Ni—Au) | Cu—Mo(Ni—Au) | FIG. 4 | Glass 2 | Nitrogen | ○ | ○ |
| Cu—W(Ni—Au) | Cu—Mo(Ni—Au) | FIG. 1 | Ag brz. mtrl. | Hydrogen | ○ | x |
| Cu—W(Ni—Au) | Cu—Mo(Ni—Au) | FIG. 2 | Ag brz. mtrl. | Hydrogen | ○ | Δ |
| Cu—W(Ni—Au) | Cu—Mo(Ni—Au) | FIG. 3 | Ag brz. mtrl. | Hydrogen | ○ | ○ |
| Cu—W(Ni—Au) | Cu—Mo(Ni—Au) | FIG. 4 | Ag brz. mtrl. | Hydrogen | ○ | ○ |

Table XLVIII.

TABLE XLVIII

| Joining member 1 | Joining member 2 | Form | Bonding agent | Bonding atmosphere | Tensile strength (kgf) | Bending strength (kgf) |
|---|---|---|---|---|---|---|
| Cu—W(Ni—Au) | SiC | FIG. 1 | Glass 1 | Nitrogen | ○ | x |
| Cu—W(Ni—Au) | SiC | FIG. 2 | Glass 1 | Nitrogen | ○ | ○ |
| Cu—W(Ni—Au) | SiC | FIG. 3 | Glass 1 | Nitrogen | ○ | ○ |
| Cu—W(Ni—Au) | SiC | FIG. 4 | Glass 1 | Nitrogen | ○ | ○ |
| Cu—W(Ni—Au) | SiC | FIG. 1 | Glass 2 | Nitrogen | ○ | x |
| Cu—W(Ni—Au) | SiC | FIG. 2 | Glass 2 | Nitrogen | ○ | ○ |
| Cu—W(Ni—Au) | SiC | FIG. 3 | Glass 2 | Nitrogen | ○ | ○ |
| Cu—W(Ni—Au) | SiC | FIG. 4 | Glass 2 | Nitrogen | ○ | ○ |
| Cu—W(Ni—Au) | SiC(W—Ni) | FIG. 1 | Ag brz. mtrl. | Hydrogen | ○ | x |
| Cu—W(Ni—Au) | SiC(W—Ni) | FIG. 2 | Ag brz. mtrl. | Hydrogen | ○ | Δ |
| Cu—W(Ni—Au) | SiC(W—Ni) | FIG. 3 | Ag brz. mtrl. | Hydrogen | ○ | ○ |
| Cu—W(Ni—Au) | SiC(W—Ni) | FIG. 4 | Ag brz. mtrl. | Hydrogen | ○ | ○ |
| Cu—W(Ni—Au) | $Al_2O_3$ | FIG. 1 | Glass 1 | Nitrogen | ○ | x |
| Cu—W(Ni—Au) | $Al_2O_3$ | FIG. 2 | Glass 1 | Nitrogen | ○ | ○ |
| Cu—W(Ni—Au) | $Al_2O_3$ | FIG. 3 | Glass 1 | Nitrogen | ○ | ○ |
| Cu—W(Ni—Au) | $Al_2O_3$ | FIG. 4 | Glass 1 | Nitrogen | ○ | ○ |
| Cu—W(Ni—Au) | $Al_2O_3$ | FIG. 1 | Glass 2 | Nitrogen | ○ | x |
| Cu—W(Ni—Au) | $Al_2O_3$ | FIG. 2 | Glass 2 | Nitrogen | ○ | ○ |
| Cu—W(Ni—Au) | $Al_2O_3$ | FIG. 3 | Glass 2 | Nitrogen | ○ | ○ |
| Cu—W(Ni—Au) | $Al_2O_3$ | FIG. 4 | Glass 2 | Nitrogen | ○ | ○ |
| Cu—W(Ni—Au) | $Al_2O_3$(W—Ni) | FIG. 1 | Ag brz. mtrl. | Hydrogen | x | x |
| Cu—W(Ni—Au) | $Al_2O_3$(W—Ni) | FIG. 2 | Ag brz. mtrl. | Hydrogen | x | x |
| Cu—W(Ni—Au) | $Al_2O_3$(W—Ni) | FIG. 3 | Ag brz. mtrl. | Hydrogen | x | x |
| Cu—W(Ni—Au) | $Al_2O_3$(W—Ni) | FIG. 4 | Ag brz. mtrl. | Hydrogen | x | x |

Table XLIX.

TABLE XLIX

| Joining member 1 | Joining member 2 | Form | Bonding agent | Bonding atmosphere | Tensile strength (kgf) | Bending strength (kgf) |
|---|---|---|---|---|---|---|
| Cu—Mo(Ni—Au) | AlN | FIG. 1 | Glass 1 | Nitrogen | ○ | x |
| Cu—Mo(Ni—Au) | AlN | FIG. 2 | Glass 1 | Nitrogen | ○ | ○ |
| Cu—Mo(Ni—Au) | AlN | FIG. 3 | Glass 1 | Nitrogen | ○ | ○ |
| Cu—Mo(Ni—Au) | AlN | FIG. 4 | Glass 1 | Nitrogen | ○ | ○ |
| Cu—Mo(Ni—Au) | AlN | FIG. 1 | Glass 2 | Nitrogen | ○ | x |
| Cu—Mo(Ni—Au) | AlN | FIG. 2 | Glass 2 | Nitrogen | ○ | ○ |
| Cu—Mo(Ni—Au) | AlN | FIG. 3 | Glass 2 | Nitrogen | ○ | ○ |
| Cu—Mo(Ni—Au) | AlN | FIG. 4 | Glass 2 | Nitrogen | ○ | ○ |
| Cu—Mo(Ni—Au) | AlN(W—Ni) | FIG. 1 | Ag brz. mtrl. | Hydrogen | ○ | x |
| Cu—Mo(Ni—Au) | AlN(W—Ni) | FIG. 2 | Ag brz. mtrl. | Hydrogen | ○ | Δ |
| Cu—Mo(Ni—Au) | AlN(W—Ni) | FIG. 3 | Ag brz. mtrl. | Hydrogen | ○ | ○ |
| Cu—Mo(Ni—Au) | AlN(W—Ni) | FIG. 4 | Ag brz. mtrl. | Hydrogen | ○ | ○ |
| Cu—Mo(Ni—Au) | Si3N4 | FIG. 1 | Glass 1 | Nitrogen | ○ | x |
| Cu—Mo(Ni—Au) | Si3N4 | FIG. 2 | Glass 1 | Nitrogen | ○ | ○ |
| Cu—Mo(Ni—Au) | Si3N4 | FIG. 3 | Glass 1 | Nitrogen | ○ | ○ |
| Cu—Mo(Ni—Au) | Si3N4 | FIG. 4 | Glass 1 | Nitrogen | ○ | ○ |
| Cu—Mo(Ni—Au) | Si3N4 | FIG. 1 | Glass 2 | Nitrogen | ○ | x |
| Cu—Mo(Ni—Au) | Si3N4 | FIG. 2 | Glass 2 | Nitrogen | ○ | ○ |
| Cu—Mo(Ni—Au) | Si3N4 | FIG. 3 | Glass 2 | Nitrogen | ○ | ○ |
| Cu—Mo(Ni—Au) | Si3N4 | FIG. 4 | Glass 2 | Nitrogen | ○ | ○ |
| Cu—Mo(Ni—Au) | Si3N4 (W—Ni) | FIG. 1 | Ag brz. mtrl. | Hydrogen | ○ | x |
| Cu—Mo(Ni—Au) | Si3N4 (W—Ni) | FIG. 2 | Ag brz. mtrl. | Hydrogen | ○ | Δ |

TABLE XLIX-continued

| Joining member 1 | Joining member 2 | Form | Bonding agent | Bonding atmosphere | Tensile strength (kgf) | Bending strength (kgf) |
|---|---|---|---|---|---|---|
| Cu—Mo(Ni—Au) | Si3N4 (W—Ni) | FIG. 3 | Ag brz. mtrl. | Hydrogen | ○ | ○ |
| Cu—Mo(Ni—Au) | Si3N4 (W—Ni) | FIG. 4 | Ag brz. mtrl. | Hydrogen | ○ | ○ |

Table L.

TABLE L

| Joining member 1 | Joining member 2 | Form | Bonding agent | Bonding atmosphere | Tensile strength (kgf) | Bending strength (kgf) |
|---|---|---|---|---|---|---|
| Cu—Mo(Ni—Au) | W(Ni—Au) | FIG. 1 | Glass 1 | Nitrogen | ○ | x |
| Cu—Mo(Ni—Au) | W(Ni—Au) | FIG. 2 | Glass 1 | Nitrogen | ○ | ○ |
| Cu—Mo(Ni—Au) | W(Ni—Au) | FIG. 3 | Glass 1 | Nitrogen | ○ | ○ |
| Cu—Mo(Ni—Au) | W(Ni—Au) | FIG. 4 | Glass 1 | Nitrogen | ○ | ○ |
| Cu—Mo(Ni—Au) | W(Ni—Au) | FIG. 1 | Glass 2 | Nitrogen | ○ | x |
| Cu—Mo(Ni—Au) | W(Ni—Au) | FIG. 2 | Glass 2 | Nitrogen | ○ | ○ |
| Cu—Mo(Ni—Au) | W(Ni—Au) | FIG. 3 | Glass 2 | Nitrogen | ○ | ○ |
| Cu—Mo(Ni—Au) | W(Ni—Au) | FIG. 4 | Glass 2 | Nitrogen | ○ | ○ |
| Cu—Mo(Ni—Au) | W(Ni—Au) | FIG. 1 | Ag brz. mtrl. | Hydrogen | ○ | x |
| Cu—Mo(Ni—Au) | W(Ni—Au) | FIG. 2 | Ag brz. mtrl. | Hydrogen | ○ | Δ |
| Cu—Mo(Ni—Au) | W(Ni—Au) | FIG. 3 | Ag brz. mtrl. | Hydrogen | ○ | ○ |
| Cu—Mo(Ni—Au) | W(Ni—Au) | FIG. 4 | Ag brz. mtrl. | Hydrogen | ○ | ○ |
| Cu—Mo(Ni—Au) | Mo(Ni—Au) | FIG. 1 | Glass 1 | Nitrogen | ○ | x |
| Cu—Mo(Ni—Au) | Mo(Ni—Au) | FIG. 2 | Glass 1 | Nitrogen | ○ | ○ |
| Cu—Mo(Ni—Au) | Mo(Ni—Au) | FIG. 3 | Glass 1 | Nitrogen | ○ | ○ |
| Cu—Mo(Ni—Au) | Mo(Ni—Au) | FIG. 4 | Glass 1 | Nitrogen | ○ | ○ |
| Cu—Mo(Ni—Au) | Mo(Ni—Au) | FIG. 1 | Glass 2 | Nitrogen | ○ | x |
| Cu—Mo(Ni—Au) | Mo(Ni—Au) | FIG. 2 | Glass 2 | Nitrogen | ○ | ○ |
| Cu—Mo(Ni—Au) | Mo(Ni—Au) | FIG. 3 | Glass 2 | Nitrogen | ○ | ○ |
| Cu—Mo(Ni—Au) | Mo(Ni—Au) | FIG. 4 | Glass 2 | Nitrogen | ○ | ○ |
| Cu—Mo(Ni—Au) | Mo(Ni—Au) | FIG. 1 | Ag brz. mtrl. | Hydrogen | ○ | x |
| Cu—Mo(Ni—Au) | Mo(Ni—Au) | FIG. 2 | Ag brz. mtrl. | Hydrogen | ○ | Δ |
| Cu—Mo(Ni—Au) | Mo(Ni—Au) | FIG. 3 | Ag brz. mtrl. | Hydrogen | ○ | ○ |
| Cu—Mo(Ni—Au) | Mo(Ni—Au) | FIG. 4 | Ag brz. mtrl. | Hydrogen | ○ | ○ |

Table LI.

TABLE LI

| Joining member 1 | Joining member 2 | Form | Bonding agent | Bonding atmosphere | Tensile strength (kgf) | Bending strength (kgf) |
|---|---|---|---|---|---|---|
| Cu—Mo(Ni—Au) | Cu—W(Ni—Au) | FIG. 1 | Glass 1 | Nitrogen | ○ | x |
| Cu—Mo(Ni—Au) | Cu—W(Ni—Au) | FIG. 2 | Glass 1 | Nitrogen | ○ | ○ |
| Cu—Mo(Ni—Au) | Cu—W(Ni—Au) | FIG. 3 | Glass 1 | Nitrogen | ○ | ○ |
| Cu—Mo(Ni—Au) | Cu—W(Ni—Au) | FIG. 4 | Glass 1 | Nitrogen | ○ | ○ |
| Cu—Mo(Ni—Au) | Cu—W(Ni—Au) | FIG. 1 | Glass 2 | Nitrogen | ○ | x |
| Cu—Mo(Ni—Au) | Cu—W(Ni—Au) | FIG. 2 | Glass 2 | Nitrogen | ○ | ○ |
| Cu—Mo(Ni—Au) | Cu—W(Ni—Au) | FIG. 3 | Glass 2 | Nitrogen | ○ | ○ |
| Cu—Mo(Ni—Au) | Cu—W(Ni—Au) | FIG. 4 | Glass 2 | Nitrogen | ○ | ○ |
| Cu—Mo(Ni—Au) | Cu—W(Ni—Au) | FIG. 1 | Ag brz. mtrl. | Hydrogen | ○ | x |
| Cu—Mo(Ni—Au) | Cu—W(Ni—Au) | FIG. 2 | Ag brz. mtrl. | Hydrogen | ○ | Δ |
| Cu—Mo(Ni—Au) | Cu—W(Ni—Au) | FIG. 3 | Ag brz. mtrl. | Hydrogen | ○ | ○ |

TABLE LI-continued

| Joining member 1 | Joining member 2 | Form | Bonding agent | Bonding atmosphere | Tensile strength (kgf) | Bending strength (kgf) |
|---|---|---|---|---|---|---|
| Cu—Mo(Ni—Au) | Cu—W(Ni—Au) | FIG. 4 | Ag brz. mtrl. | Hydrogen | ○ | ○ |
| Cu—Mo(Ni—Au) | Cu—Mo(Ni—Au) | FIG. 1 | Glass 1 | Nitrogen | ○ | x |
| Cu—Mo(Ni—Au) | Cu—Mo(Ni—Au) | FIG. 2 | Glass 1 | Nitrogen | ○ | ○ |
| Cu—Mo(Ni—Au) | Cu—Mo(Ni—Au) | FIG. 3 | Glass 1 | Nitrogen | ○ | ○ |
| Cu—Mo(Ni—Au) | Cu—Mo(Ni—Au) | FIG. 4 | Glass 1 | Nitrogen | ○ | ○ |
| Cu—Mo(Ni—Au) | Cu—Mo(Ni—Au) | FIG. 1 | Glass 2 | Nitrogen | ○ | x |
| Cu—Mo(Ni—Au) | Cu—Mo(Ni—Au) | FIG. 2 | Glass 2 | Nitrogen | ○ | ○ |
| Cu—Mo(Ni—Au) | Cu—Mo(Ni—Au) | FIG. 3 | Glass 2 | Nitrogen | ○ | ○ |
| Cu—Mo(Ni—Au) | Cu—Mo(Ni—Au) | FIG. 4 | Glass 2 | Nitrogen | ○ | ○ |
| Cu—Mo(Ni—Au) | Cu—Mo(Ni—Au) | FIG. 1 | Ag brz. mtrl. | Hydrogen | ○ | x |
| Cu—Mo(Ni—Au) | Cu—Mo(Ni—Au) | FIG. 2 | Ag brz. mtrl. | Hydrogen | ○ | Δ |
| Cu—Mo(Ni—Au) | Cu—Mo(Ni—Au) | FIG. 3 | Ag brz. mtrl. | Hydrogen | ○ | ○ |
| Cu—Mo(Ni—Au) | Cu—Mo(Ni—Au) | FIG. 4 | Ag brz. mtrl. | Hydrogen | ○ | ○ |

Table LII.

TABLE LII

| Joining member 1 | Joining member 2 | Form | Bonding agent | Bonding atmosphere | Tensile strength (kgf) | Bending strength (kgf) |
|---|---|---|---|---|---|---|
| Cu—Mo(Ni—Au) | SiC | FIG. 1 | Glass 1 | Nitrogen | ○ | x |
| Cu—Mo(Ni—Au) | SiC | FIG. 2 | Glass 1 | Nitrogen | ○ | ○ |
| Cu—Mo(Ni—Au) | SiC | FIG. 3 | Glass 1 | Nitrogen | ○ | ○ |
| Cu—Mo(Ni—Au) | SiC | FIG. 4 | Glass 1 | Nitrogen | ○ | ○ |
| Cu—Mo(Ni—Au) | SiC | FIG. 1 | Glass 2 | Nitrogen | ○ | x |
| Cu—Mo(Ni—Au) | SiC | FIG. 2 | Glass 2 | Nitrogen | ○ | ○ |
| Cu—Mo(Ni—Au) | SiC | FIG. 3 | Glass 2 | Nitrogen | ○ | ○ |
| Cu—Mo(Ni—Au) | SiC | FIG. 4 | Glass 2 | Nitrogen | ○ | ○ |
| Cu—Mo | SiC | FIG. 1 | Active Ag brz. mtrl. | Vacuum | ○ | x |
| Cu—Mo | SiC | FIG. 2 | Active Ag brz. mtrl. | Vacuum | ○ | Δ |
| Cu—Mo | SiC | FIG. 3 | Active Ag brz. mtrl. | Vacuum | ○ | ○ |
| Cu—Mo | SiC | FIG. 4 | Active Ag brz. mtrl. | Vacuum | ○ | ○ |
| Cu—Mo | SiC(W—Ni) | FIG. 1 | Ag brz. mtrl. | Hydrogen | ○ | x |
| Cu—Mo | SiC(W—Ni) | FIG. 2 | Ag brz. mtrl. | Hydrogen | ○ | Δ |
| Cu—Mo | SiC(W—Ni) | FIG. 3 | Ag brz. mtrl. | Hydrogen | ○ | ○ |
| Cu—Mo | SiC(W—Ni) | FIG. 4 | Ag brz. mtrl. | Hydrogen | ○ | ○ |

Table LIII.

TABLE LIII

| Joining member 1 | Joining member 2 | Form | Bonding agent | Bonding atmosphere | Tensile strength (kgf) | Bending strength (kgf) |
|---|---|---|---|---|---|---|
| Cu—Mo (Ni—Au) | $Al_2O_3$ | FIG. 1 | Glass 1 | Nitrogen | ○ | x |
| Cu—Mo (Ni—Au) | $Al_2O_3$ | FIG. 2 | Glass 1 | Nitrogen | ○ | ○ |
| Cu—Mo (Ni—Au) | $Al_2O_3$ | FIG. 3 | Glass 1 | Nitrogen | ○ | ○ |
| Cu—Mo (Ni—Au) | $Al_2O_3$ | FIG. 4 | Glass 1 | Nitrogen | ○ | ○ |
| Cu—Mo (Ni—Au) | $Al_2O_3$ | FIG. 1 | Glass 2 | Nitrogen | ○ | x |
| Cu—Mo (Ni—Au) | $Al_2O_3$ | FIG. 2 | Glass 2 | Nitrogen | ○ | ○ |
| Cu—Mo (Ni—Au) | $Al_2O_3$ | FIG. 3 | Glass 2 | Nitrogen | ○ | ○ |
| Cu—Mo (Ni—Au) | $Al_2O_3$ | FIG. 4 | Glass 2 | Nitrogen | ○ | ○ |
| Cu—Mo | $Al_2O_3$ | FIG. 1 | Active Ag brz. mtrl. | Vacuum | ○ | x |
| Cu—Mo | $Al_2O_3$ | FIG. 2 | Active Ag brz. mtrl. | Vacuum | ○ | Δ |

TABLE LIII-continued

| Joining member 1 | Joining member 2 | Form | Bonding agent | Bonding atmosphere | Tensile strength (kgf) | Bending strength (kgf) |
|---|---|---|---|---|---|---|
| Cu—Mo | Al$_2$O$_3$ | FIG. 3 | Active Ag brz. mtrl. | Vacuum | ○ | ○ |
| Cu—Mo | Al$_2$O$_3$ | FIG. 4 | Active Ag brz. mtrl. | Vacuum | ○ | ○ |
| Cu—Mo | Al$_2$O$_3$ (W—Ni) | FIG. 1 | Ag brz. mtrl. | Hydrogen | ○ | x |
| Cu—Mo | Al$_2$O$_3$ (W—Ni) | FIG. 2 | Ag brz. mtrl. | Hydrogen | ○ | x |
| Cu—Mo | Al$_2$O$_3$ (W—Ni) | FIG. 3 | Ag brz. mtrl. | Hydrogen | ○ | x |
| Cu—Mo | Al$_2$O$_3$ (W—Ni) | FIG. 4 | Ag brz. mtrl. | Hydrogen | ○ | x |

Table LIV.

TABLE LIV

| Joining member 1 | Joining member 2 | Form | Bonding agent | Bonding atmosphere | Tensile strength (kgf) | Bending strength (kgf) |
|---|---|---|---|---|---|---|
| Ni | Ni | FIG. 1 | Ag brz. mtrl. | Hydrogen | ○ | ○ |
| Ni | Ni | FIG. 2 | Ag brz. mtrl. | Hydrogen | ○ | ○ |
| Ni | Ni | FIG. 3 | Ag brz. mtrl. | Hydrogen | ○ | ○ |
| Ni | Ni | FIG. 4 | Ag brz. mtrl. | Hydrogen | ○ | ○ |
| Ni | Cu (Ni) | FIG. 1 | Ag brz. mtrl. | Hydrogen | ○ | ○ |
| Ni | Cu (Ni) | FIG. 2 | Ag brz. mtrl. | Hydrogen | ○ | ○ |
| Ni | Cu (Ni) | FIG. 3 | Ag brz. mtrl. | Hydrogen | ○ | ○ |
| Ni | Cu (Ni) | FIG. 4 | Ag brz. mtrl. | Hydrogen | ○ | ○ |
| Cu (Ni) | Ni | FIG. 1 | Ag brz. mtrl. | Hydrogen | Δ | Δ |
| Cu (Ni) | Ni | FIG. 2 | Ag brz. mtrl. | Hydrogen | ○ | ○ |
| Cu (Ni) | Ni | FIG. 3 | Ag brz. mtrl. | Hydrogen | ○ | ○ |
| Cu (Ni) | Ni | FIG. 4 | Ag brz. mtrl. | Hydrogen | ○ | ○ |
| Cu (Ni) | Cu (Ni) | FIG. 1 | Ag brz. mtrl. | Hydrogen | Δ | Δ |
| Cu (Ni) | Cu (Ni) | FIG. 2 | Ag brz. mtrl. | Hydrogen | ○ | ○ |
| Cu (Ni) | Cu (Ni) | FIG. 3 | Ag brz. mtrl. | Hydrogen | ○ | ○ |
| Cu (Ni) | Cu (Ni) | FIG. 4 | Ag brz. mtrl. | Hydrogen | ○ | ○ |

As determined by the present invention, joint formations in which two joining members are joined with a bonding agent may be realized to have sufficiently high joint strength in the direction perpendicular to the joint plane, and meanwhile also in the direction parallel to the joint plane—which is very much advantageous in high-strength joints between two joining members employed in a variety of electrical and electronic components.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A susceptor-component joint formation, being a structure in which two joining members employed in a susceptor component are joined to each other, the joint formation comprising:
    a first joining member having a joint conformation formed with at least two distinct yet continuous surface features that are integral with said first joining member, and a second joining member having a joint conformation formed with at least three distinct yet continuous surface features that are integral with said second joining member, said first joining-member joint conformation and said second joining-member joint conformation each being defined so that neither conformation is the complete topographical opposite of the other; and
    a bonding agent interposed between the joint conformations to join said two joining members together.

2. The susceptor-component joint formation as set forth in claim 1, wherein said two joining members differ from each other, and said joining members differ from said bonding agent, by 5.0×10$^{-6}$/° C. or less in coefficient of thermal expansion.

3. The susceptor-component joint formation as set forth in claim 1, wherein said bonding agent is glass or a metal brazing material.

4. The susceptor-component joint formation as set forth in claim 2, wherein said bonding agent is glass or a metal brazing material.

5. The susceptor-component joint formation as set forth in claim 1, wherein said two joining members are a metal-metal, metal-ceramic, or ceramic-ceramic combination.

6. The susceptor-component joint formation as set forth in claim 2, wherein said two joining members are a metal-metal, metal-ceramic, or ceramic-ceramic combination.

7. The susceptor-component joint formation as set forth in claim 3, wherein said two joining members are a metal-metal, metal-ceramic, or ceramic-ceramic combination.

8. The susceptor-component joint formation as set forth in claim 5, wherein said metal is nickel, tungsten, molybdenum, copper, copper-tungsten, or copper-molybdenum.

9. The susceptor-component joint formation as set forth in claim 6, wherein said metal is nickel, tungsten, molybdenum, copper, copper-tungsten, or copper-molybdenum.

10. The susceptor-component joint formation as set forth in claim 7, wherein said metal is nickel, tungsten, molybdenum, copper, copper-tungsten, or copper-molybdenum.

11. The susceptor-component joint formation as set forth in claim 5, wherein said ceramic is aluminum nitride, silicon nitride, silicon carbide, or aluminum oxide.

12. The susceptor-component joint formation as set forth in claim 6, wherein said ceramic is aluminum nitride, silicon nitride, silicon carbide, or aluminum oxide.

13. The susceptor-component joint formation as set forth in claim 7, wherein said ceramic is aluminum nitride, silicon nitride, silicon carbide, or aluminum oxide.

14. The susceptor-component joint formation as set forth in claim 1, wherein one of either said two joining members is aluminum nitride.

15. The susceptor-component joint formation as set forth in claim 2, wherein one of either said two joining members is aluminum nitride.

16. The susceptor-component joint formation as set forth in claim 5, wherein one of either said two joining members is aluminum nitride.

17. The susceptor-component joint formation as set forth in claim 6, wherein one of either said two joining members is aluminum nitride.

18. The susceptor-component joint formation as set forth in claim 7, wherein one of either said two joining members is aluminum nitride.

* * * * *